(12) United States Patent
Iraneta et al.

(10) Patent No.: US 11,161,057 B2
(45) Date of Patent: Nov. 2, 2021

(54) DEVICE FOR SOLID PHASE EXTRACTION AND METHOD FOR USE THEREOF

(71) Applicant: Waters Technologies Corporation, Milford, MA (US)

(72) Inventors: Pamela C. Iraneta, Brighton, MA (US); Xin Zhang, Newton, MA (US); Frank John Marszalkowski, Jr., Cumberland, RI (US)

(73) Assignee: Waters Technologies Corporation, Milford, MA (US)

( * ) Notice: Subject to any disclaimer, the term of this patent is extended or adjusted under 35 U.S.C. 154(b) by 396 days.

(21) Appl. No.: 15/536,506

(22) PCT Filed: Dec. 16, 2015

(86) PCT No.: PCT/US2015/065993
§ 371 (c)(1),
(2) Date: Jun. 15, 2017

(87) PCT Pub. No.: WO2016/100447
PCT Pub. Date: Jun. 23, 2016

(65) Prior Publication Data
US 2018/0001229 A1 Jan. 4, 2018

Related U.S. Application Data

(60) Provisional application No. 62/168,559, filed on May 29, 2015, provisional application No. 62/093,286, filed on Dec. 17, 2014.

(51) Int. Cl.
*B01D 15/38* (2006.01)
*B01J 20/28* (2006.01)
(Continued)

(52) U.S. Cl.
CPC ........ *B01D 15/3847* (2013.01); *B01J 20/287* (2013.01); *B01J 20/288* (2013.01);
(Continued)

(58) Field of Classification Search
CPC ........ B01D 15/02; B01D 15/08; B01D 15/10; B01D 15/26; B01D 15/38; B01D 15/3804;
(Continued)

(56) References Cited

U.S. PATENT DOCUMENTS 5,589,062 A 12/1996 Rice
5,882,521 A * 3/1999 Bouvier ................ B01D 15/00
210/198.2
(Continued)

FOREIGN PATENT DOCUMENTS

CN 101246178 A 8/2008

OTHER PUBLICATIONS

Uretschlaeger et al., vol. 37, 2002—Issue 7, pp. 1683-1697 (Year: 2002).*
(Continued)

*Primary Examiner* — Joseph W Drodge
(74) *Attorney, Agent, or Firm* — Kacvinsky Daisak Bluni PLLC

(57) ABSTRACT

Disclosed is a device for a solid phase extraction comprising two or more of the sorbents to remove phospholipids and salts from a sample, to thereby eliminate matrix effects during mass spectrometry analysis. In particular, the sorbents includes at least one sorbent which is water-wettable and contains at least one hydrophobic component and at least one hydrophilic component and at least one of sorbent having a specific affinity for a matrix interference like phospholipids. Further disclosed is a method using the device of the present invention.

13 Claims, 8 Drawing Sheets

(51) Int. Cl.
*B01J 20/32* (2006.01)
*G01N 30/72* (2006.01)
*G01N 30/50* (2006.01)
*B01J 20/287* (2006.01)
*B01J 20/288* (2006.01)
*G01N 30/00* (2006.01)
*G01N 1/40* (2006.01)

(52) U.S. Cl.
CPC ..... *B01J 20/28052* (2013.01); *B01J 20/3204* (2013.01); *B01J 20/3217* (2013.01); *B01J 20/3246* (2013.01); *B01J 20/3285* (2013.01); *B01J 20/3293* (2013.01); *G01N 30/50* (2013.01); *G01N 30/72* (2013.01); *G01N 2001/4061* (2013.01); *G01N 2030/009* (2013.01)

(58) Field of Classification Search
CPC ....... B01D 15/3847; B01J 28/00; B01J 28/02; B01J 28/10; B01J 28/103; B01J 28/16; B01J 28/226; B01J 28/28; B01J 28/28002; B01J 28/288; B01J 28/3204; B01J 28/3217; B01J 28/3285; B01J 28/3293; B01J 20/3246; B01J 20/287; B01J 20/288; B01J 20/3204; B01J 20/3217; B01J 20/3285; B01J 20/3293; B01J 20/28052; G01N 13/00; G01N 30/00; G01N 30/02; G01N 30/48; G01N 30/482; G01N 2030/027; G01N 30/72; G01N 30/50; G01N 2001/4061; G01N 2030/009
USPC .... 210/638, 502.1, 503, 504, 506, 656, 661, 210/670, 679, 680, 690, 691, 692, 693
See application file for complete search history.

(56) References Cited

U.S. PATENT DOCUMENTS

| | | | |
|---|---|---|---|
| 6,071,410 A | 6/2000 | Nau et al. | |
| 7,232,520 B1* | 6/2007 | Lee | B01J 20/26 210/198.2 |
| 7,999,084 B2 | 8/2011 | Jones | |
| 8,123,949 B2* | 2/2012 | Gilar | B01D 15/1878 210/656 |
| 8,409,865 B2* | 4/2013 | Calton | G01N 30/14 436/131 |
| 2006/0138052 A1* | 6/2006 | Leistner | B01J 20/28004 210/692 |
| 2008/0272053 A1* | 11/2008 | Chandler | B01J 20/28052 210/658 |
| 2008/0287661 A1* | 11/2008 | Jones | B01L 3/0275 530/418 |
| 2010/0291688 A1* | 11/2010 | Lu | B01J 20/06 436/17 |
| 2012/0048002 A1* | 3/2012 | Mallet | B01L 3/5635 73/61.43 |
| 2012/0178950 A1* | 7/2012 | Sugo | B01J 20/048 554/83 |
| 2013/0053588 A1* | 2/2013 | Iraneta | B01D 15/22 554/83 |
| 2014/0046112 A1* | 2/2014 | Boyd | B01J 20/28042 585/823 |

OTHER PUBLICATIONS

Guo et al., Anal Biochem. Jul. 1, 2012; 426(1): 86-90. doi: 10.1016/j.ab.2012.04.003. (Year: 2012).*

Solid-Phase Extraction with Oasis(R) HLB Sorbent: Simple Procedures for Superior Sample Preparation (Year: 1998).*

International Search Report issued in PCT/US2015/065993, dated May 4, 2016.

Catalogue, Waters, "Water sorbent selection guide for solid-phase extraction", Nov. 25, 2014.

Catalogue, Waters, "A universal approach to a complex analytical challenge", Dec. 27, 2013.

Extended European Search Report fro EP Patent Application No. 15870948.5 dated Oct. 24, 2018.

Fontanals, N. et al., "Overview of the novel sorbents available in solid-phase extraction to improve the capacity and selectivity of analytical determinations", Contributions to Science, 6(1):199-213, Jan. 1, 2010 (Jan. 1, 2010).

Laven, M. et al., "Serial mixed-mode cation- and anion-exchange solid-phase extraction for separation of basic, neutral and acidic pharmaceuticals in wastewater and analysis by high-performance liquid chromatography-quadrupole time-of-flight mass spectrometry", Journal of Chromatography A, Elsevier, 1216(1): 49-62, Jan. 2, 2009.

* cited by examiner

DEVICE FOR SOLID PHASE EXTRACTION AND METHOD FOR USE THEREOF

CROSS REFERENCE TO RELATED APPLICATIONS

This application is a 371 US National Phase of International PCT Patent Application No. PCT/US2015/065993, filed Dec. 16, 2015, which application claims the benefit of U.S. Provisional Patent Application Nos. 62/093,286, filed Dec. 17, 2014 and 62/168,559, filed May 29, 2015. The entire contents of these applications are incorporated herein by reference in their entirety.

TECHNICAL FIELD

The present invention relates to a device for extraction. In particular, the device includes multiple sorbents, to thereby provide a simple solid phase extraction and preparation method before analysis, particularly by mass spectrometry.

BACKGROUND

Accurate analysis of molecules such as pharmaceutical agents or metabolites associated with diseases or symptoms are very critical in medical diagnosis or in clinical chemistry. Since most of biological samples or clinical samples such as blood sample, urine sample, serum, plasma and the like are a cocktail of molecules, compounds and cellular debris, the molecule of interest may be interfered with other matrix materials in the samples. Therefore, cleaning up of the samples and removal of the interfering matrix materials prior to bioanalysis are essential for reproducible and reliable results.

Solid phase extraction (SPE) methods have been widely used for cleaning-up procedures of biological samples, food samples, and environmental samples which include various interfering components. For example, for biological samples, the SPE application mainly separates the salts, phospholipids and/or proteins from the sample to thereby eliminate interference during mass spectrometry (MS) analysis. The shortcomings of SPE are that the typical protocols require at least 5 steps and depending on the analyte of interest may require method development in order to remove interferences. Although those skilled in the art of SPE method development are capable of this task, the skill is getting harder to find. This has left room for other sample preparation methods that do not require method development.

Pass through methods are among the simplest to execute. However, pass through methods still may not provide extracted samples which are substantially free of mass spectrometer (MS) matrix interferences to satisfy sensitivity and reproducibility according to FDA guidance. In particular, polar matrix components and salts remaining in the sample can disrupt the MS ionization by forming multiple ionic complexes or suppressing or enhancing the ionization of the analyte of interest in deference to an interfering component. The factors contribute to diminished accuracy of analysis due to variations in concentration and type of interfering component from sample to sample As such, the present invention addresses the need to produce clean samples and sample extracts containing high recoveries of the molecules of interest using a simple generic method that have been developed for biological samples or environmental samples to be analyzed by mass spectrometry or any other technique using nebulization and ionization of sample components prior to detection.

SUMMARY OF THE INVENTION

The present invention provides a separation device and a chromatographic column. In particular, the device or the chromatographic column may be used to remove interfering components such as phospholipids, proteins and salts in a sample prior to mass spectrometric analysis, thereby reducing or eliminating matrix effects. A single solid phase extraction method cannot be developed for all possible analytes unless a "universally" selective sorbent provides retention for the analytes but not matrix interferences. However, the problem with universally selective/retentive sorbents is that they may also retain matrix interferences that elute with the analytes and prevent high sensitivity, or produce irreproducible and/or inaccurate quantitation of the analytes.

The present invention combines a highly retentive sorbent(s) with specifically selective sorbents that are designed to remove at least one major matrix interference from the sample prior to mass spectrometric (MS) analysis. By providing retention for an extremely diverse set of analytes while simultaneously targeting the removal of well understood specific matrix interferences, a single "generic" method can provide clean extracts for analysis by MS for samples containing common interferences. By targeting the removal of specific endogenous matrix interferences, this same method may provide clean extracts for a previously or a priori undefined set of analytes having properties similar to pharmaceutically or environmentally relevant analytes.

This strategy can also be applied to the pass through clean up of samples. In this case at least two sorbents are combined to remove more than one major matrix interferences from the sample prior to mass spectrometric (MS) analysis. In the art, single sorbent devices have been provided for pass through clean up and the removal of at least one major matrix sample interference that adversely affects quantitation by MS. The combination of judiciously selected sorbents is able to remove more than one major matrix interference for a more comprehensive a priori undefined set of analytes.

Multisorbent devices are known in the art but the purpose of these multisorbent devices is the retention of specific analytes or specific analyte sets such as Analytical Method 5972 or 5973N (similar to EPA SW846 Method 8260B, NIOSH Method 2549 and equivalent to EPA compendium Method TO-17) for volatile organic compounds (VOC). The existing multisorbent devices have been developed to retain application specific analyte sets such as dioxins and polychlorinated biphenyls from serum as described previously (*J Chromatogr A*. 2006 Oct. 13; 1130(1):97-107, 2006 Jun. 30, "High-throughput biomonitoring of dioxins and polychlorinated biphenyls at the sub-picogram level in human serum", Focant JF1, Eppe G, Massart A C, Scholl G, Pirard C, De Pauw E.). Other applications of multisorbent devices include fractionation of foodstuffs to accommodate various analytical methods used for food analysis as described previously (Food Contaminants and Residue Analysis, By Yolanda Picó, Elsevier, 2008). The coupling of different sorbent devices has also been used for this purpose.

With the advent of newer more sensitive MS instrumentation and the lack of those skilled in the art of SPE method development, room is left for other sample preparation devices and methods that do not require method development and are more generic in their application.

In one aspect, provided is a separation device which may comprise: at least two or more sorbents. Particularly, for aqueous samples the separation device may include at least one sorbent containing at least one hydrophobic component and at least one hydrophilic component and at least one sorbent having a specific affinity to phospholipids. For samples containing >50% organic solvent, the sorbents may include at least one hydrophobic sorbent, such that the hydrophobic sorbent does not substantially interact with aqueous samples, and at least one sorbent having a specific affinity to phospholipids. The sorbents may also be selected from the group consisting of a silica, a modified silica, an alumina, an modified alumina, titanium and zirconium oxides, graphitized carbon or activated carbon, magnesium-silica (e.g. Florisil®), polymer, a modified polymer and combinations thereof. The sorbents may also be porous, nonporous or pellicular.

In certain embodiments, for aqueous samples, the sorbents may be layered. In particular, a top layer may be the sorbent containing at least one hydrophobic component and at least one hydrophilic component. Alternatively, the sorbents may be mixed in a single layer in a separation device. In particular, the sorbent containing at least one hydrophobic component and at least one hydrophilic component and the sorbent having a specific affinity to phospholipid may be mixed at a weight ratio of about 1:2, respectively.

In certain embodiments, the separation device may further include at least one frit or filter. The frit or filter may be disposed at the bottom of the device to retain the sorbents. In addition, the separation device may further include an inlet and an outlet; or a housing. Exemplary housing may be a syringe, a cartridge, a column, a multiple chamber, a 4 to 8-well rack, a 4 to 8-well strip, a 48 to 96-well plate, a 96 to 384-well micro-elution plate, micro-elution tip, a 96 to 384-micro-elution tip array, a 4 to 8-tip micro-elution strip, a single micro-elution pipet tip, or a spin tube or a spin container. Moreover, the separation device may further include a vacuum chamber, reservoir or a structure to allow for use in a centrifuge, or with a vacuum or pressure source.

In an exemplary embodiment, the sorbent containing at least one hydrophobic component and at least one hydrophilic component may be water wettable. It is appreciated that OASIS® HLB sorbent may provide the suitable option for the water-wettable sorbent. The sorbent having the specific affinity to phospholipids may be a silica-based particle containing a modified or unmodified $C_8$ to $C_{30}$ alkyl or octadecyl ($C_{18}$) components.

In one aspect, a chromatographic column is also provided. The chromatographic column may comprise: a column having a cylindrical interior for accepting a sorbent bed and at least two or more sorbents. Particularly, the chromatographic column may include at least one sorbent containing at least one hydrophobic component and at least one hydrophilic component and at least one sorbent having a specific affinity to phospholipids. Further, the sorbent containing at least one hydrophobic component and at least one hydrophilic component may be water wettable. The sorbents may also be selected from the group consisting of a silica, a modified silica, an alumina, an modified alumina, titanium and zirconium oxides, graphitized carbon or activated carbon, magnesium-silica (Florisil®), a modified polymer and combinations thereof. The sorbents may also be porous, nonporous or pellicular.

In certain embodiments, the sorbents may be layered. In particular, a top layer may be the sorbent containing at least one hydrophobic component and at least one hydrophilic component. Alternatively, the sorbents may be mixed in a single layer. In particular, the sorbent containing at least one hydrophobic component and at least one hydrophilic component and the sorbent having a specific affinity to phospholipid may be mixed at a weight ratio of about 1:2, respectively. In certain embodiments, the chromatographic column may further include at least one frit or filter. The frit or filter may be disposed at the bottom of the sorbents. In addition, the chromatographic column may further include an inlet and an outlet. Moreover, the chromatographic column may further include a vacuum chamber, reservoir or a structure to allow for use in a centrifuge or with a vacuum or pressure source.

In certain exemplary embodiments, the chromatographic column may be included in a syringe, a cartridge, a column, a multiple chamber, a 4 to 8-well rack, a 4 to 8-well strip, a 48 to 96-well plate, a 96 to 384-well micro-elution plate, micro-elution tip, a 96 to 384-micro-elution tip array, a 4 to 8-tip micro-elution strip, a single micro-elution pipet tip, a spin tube or a spin container.

In an exemplary embodiment, the sorbent containing at least one hydrophobic component and at least one hydrophilic component may be OASIS® HLB sorbent and the sorbent having the specific affinity to phospholipids may be a silica-based particle containing a modified or unmodified $C_8$ to $C_{30}$ alkyl or octadecyl ($C_{18}$) component.

Further, in one aspect, a chromatographic device is provided. The chromatographic device may comprise: a column having a cylindrical interior for accepting a sorbent bed; and at least two or more sorbents. In particular, at least one sorbent may contain at least one hydrophobic component and at least one hydrophilic component and at least one sorbent may have a specific affinity to phospholipids are included in the sorbent bed. Further, the sorbent containing at least one hydrophobic component and at least one hydrophilic component may be water wettable.

In certain embodiments, the sorbents may be layered. In particular, a top layer may be the sorbent containing at least one hydrophobic component and at least one hydrophilic component. Alternatively, the sorbents may be mixed in a single layer. In particular, the sorbent containing at least one hydrophobic component and at least one hydrophilic component and the sorbent having a specific affinity to phospholipid may be mixed at a weight ratio of about 1:2.

In certain exemplary embodiments, the chromatographic device may further include at least one frit or filter. The frit or filter may be disposed at the bottom of the sorbents. In addition, the chromatographic device may further include an inlet and an outlet; or a housing. Exemplary housing may be a syringe, a cartridge, a column, a multiple chamber, a 4 to 8-well rack, a 4 to 8-well strip, a 48 to 96-well plate, a 96 to 384-well micro-elution plate, micro-elution tip, a 96 to 384-micro-elution tip array, a 4 to 8-tip micro-elution strip, a single micro-elution pipet tip, a spin tube or a spin container. Moreover, the chromatographic device may further include a vacuum chamber, reservoir or a structure to allow for use in a centrifuge or with a vacuum or pressure source.

In an exemplary embodiment, the sorbent containing at least one hydrophobic component and at least one hydrophilic component may be OASIS® HLB sorbent and the sorbent having the specific affinity to phospholipids may be a silica containing a modified or unmodified $C_8$ to $C_{30}$ alkyl or octadecyl ($C_{18}$) component Still further, a solid phase extraction method is provided. The method may include: using the device or the chromatographic column as described above. In particular, the device or the chromatographic column may comprise a sorbent bed including a sorbent containing at least one hydrophobic component and at least one hydrophilic component and a sorbent having a specific affinity to phospholipids. Further, the sorbent containing at least one hydrophobic component and at least one hydrophilic component may be water wettable.

In certain embodiments, the sorbents may be layered. In particular, a top layer may be the sorbent containing at least one hydrophobic component and at least one hydrophilic component. Alternatively, the sorbents may be mixed in a single layer or a single sorbent bed. In particular, the sorbent containing at least one hydrophobic component and at least one hydrophilic component and the sorbent having a specific affinity to phospholipid may be mixed at a weight ratio of about 1:2. The weight ratios may be determined to provide retention for the analytes to be quantitated and to provide adequate retention for phospholipids in the elution solvent such that the analytes are eluted in the elution solvent substantially free of phospholipids, salts, proteins and other highly polar matrix components that cause ion suppression or enhancement of mass spectrometric analyses or compromise the lifetime of the analytical column used in front of the mass spectrometer for analyte resolution prior to quantitation.

For pass through applications the sorbent weight ratios are determined by the required mass capacity to remove at least two major matrix inferences.

In an exemplary embodiment, the sorbent containing at least one hydrophobic component and at least one hydrophilic component may be OASIS® HLB sorbent and the sorbent having the specific affinity to phospholipids may be a silica containing a modified or unmodified $C_8$ to $C_{30}$ alkyl or octadecyl ($C_{18}$) component.

In an exemplary embodiment, the device may be a syringe, a cartridge, a column, a multiple chamber, a 8-well rack, a 8-well strip, a 96-well plate, 96-well micro-elution plate, micro-elution tip, a 96-micro-elution tip array, an 8-tip micro-elution strip, a single micro-elution pipet tip, a spin tube or a spin container.

In certain exemplary embodiments, the method may further comprise conditioning the sorbent bed and methanol may be used for the conditioning.

In certain exemplary embodiments, the method may further comprise equilibrating the sorbent bed and water may be used for the equilibrating.

In certain exemplary embodiments, the method may further comprise loading a sample on the sorbent bed without the need for conditioning or equilibrating the sorbent bed. The sample may be a biofluid, tissue, food or environmental sample.

Alternatively, when the sorbent containing at least one hydrophobic component and at least one hydrophilic component is water wettable, the sample may be loaded on the sorbent bed without conditioning and equilibrating the sorbent bed.

In certain exemplary embodiments, the method may further comprise eluting analytes from the sorbent bed. For example, a mixture of acetonitrile and methanol at a mixing ration of about 90:10 is used for eluting. In particular, after eluting analytes, an eluate obtained from the method may contain less than about 2 wt % of phospholipids in the loaded sample. Further, the analytes from the sorbents may be further analyzed using liquid chromatography-UV, liquid chromatography-mass spectrometry/mass spectrometry (LC-MS/MS), mass spectrometry (MS), MALDI-MS, Electrospray Ionization (ESI), Sector, Time of Flight (ToF) or Ion Traps.

In certain exemplary embodiments, a vacuum chamber, reservoir or a structure to allow for use in a centrifuge or with a vacuum or pressure source may be applied to the device for improving a flow rate.

In still other aspects, the invention provides a separation device, a chromatographic column, or a chromatographic device comprising two or more sorbents, wherein
the matrix interferences retained on one of the sorbents is substantially removed by the other sorbent as compared to a separation device comprising only one sorbent;
the flowrate of the combined sorbents is substantially improved as compared to a separation device comprising only one sorbent; or
the backpressure of the combined sorbents is substantially reduced as compared to a separation device comprising only one sorbent.

In another aspect, the invention provides method for removing the matrix interferences retained by a sorbent, comprising mixing the sorbent with at least one or more additional sorbents of a different type. In certain embodiments, the sorbent and the at least one or more additional sorbents are mixed in a single layer. In other embodiments, the sorbent is a water-wettable sorbent and at least one additional sorbent is not a water-wettable sorbent. In other embodiments, the sorbent is not a water-wettable sorbent and at least one additional sorbent is a water-wettable sorbent.

In another aspect, the invention provides method for increasing the flowrate of a sorbent, comprising mixing the sorbent with at least one or more additional sorbents of a different type. In certain embodiments, the sorbent and the at least one or more additional sorbents are mixed in a single layer. In other embodiments, the sorbent is a water-wettable sorbent and at least one additional sorbent is not a water-wettable sorbent. In other embodiments, the sorbent is not a water-wettable sorbent and at least one additional sorbent is a water-wettable sorbent.

In another aspect, the invention provides method for reducing the backpressure of a sorbent, comprising mixing the sorbent with at least one or more additional sorbents of a different type. In certain embodiments, the sorbent and the at least one or more additional sorbents are mixed in a single layer. In other embodiments, the sorbent is a water-wettable sorbent and at least one additional sorbent is not a water-wettable sorbent. In other embodiments, the sorbent is not a water-wettable sorbent and at least one additional sorbent is a water-wettable sorbent.

Other aspects of the devices and methods of the invention may be disclosed infra.

DETAILED DESCRIPTION OF THE INVENTION

Figure 1:
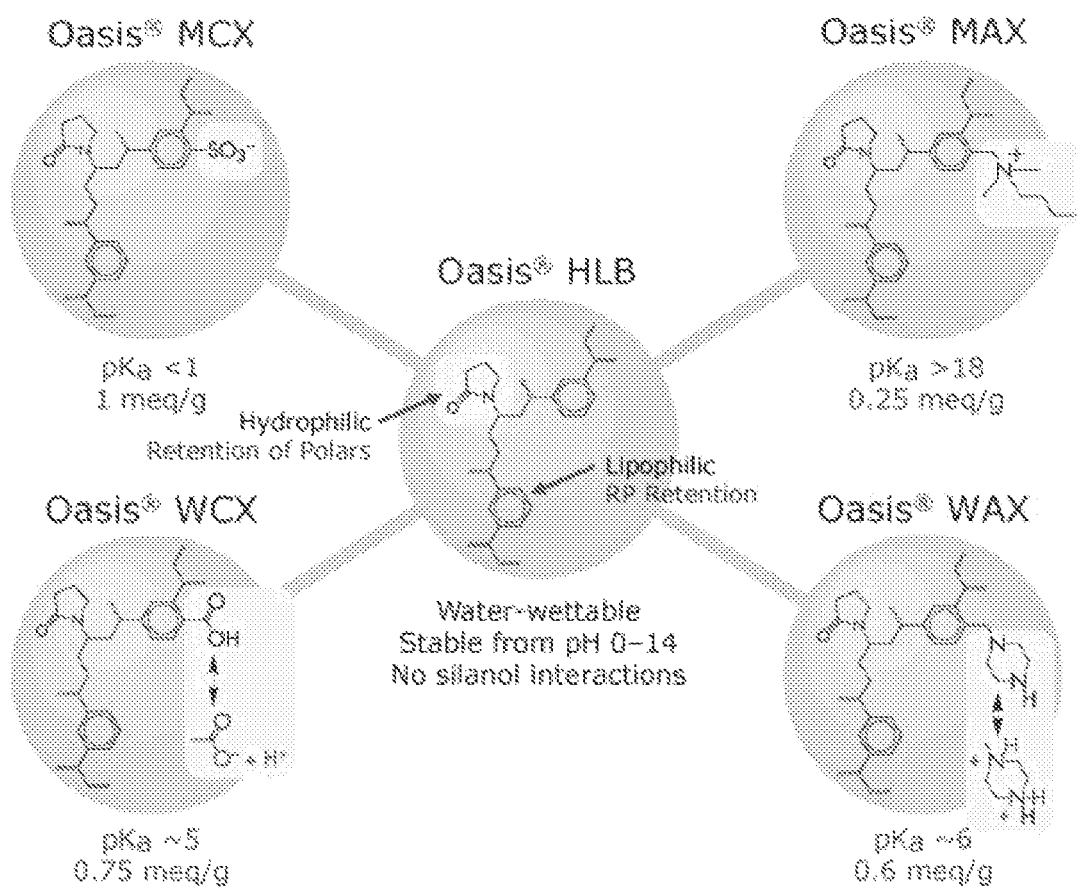
FIG. 1 shows exemplary sorbents. For example, OASIS® HLB sorbent containing a hydrophobic component and a hydrophilic component may be used according to an exemplary embodiment of the present invention. In addition, other OASIS® sorbents containing ion exchange groups may be used without limitation based on a user's requirements.
Figure 2A:
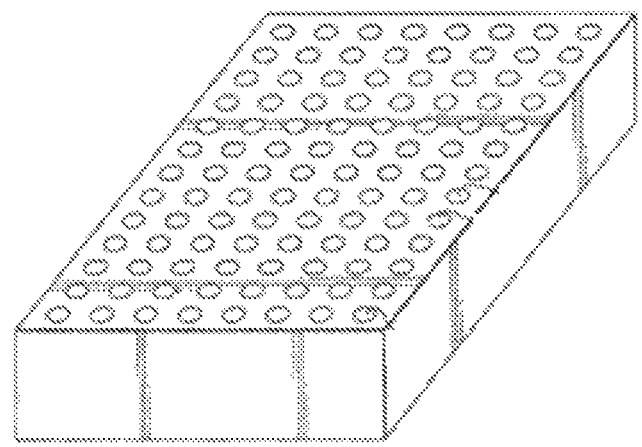
FIG. 2A-2B show exemplary houses of the device according to exemplary embodiments of the present invention.
Figure 2B:
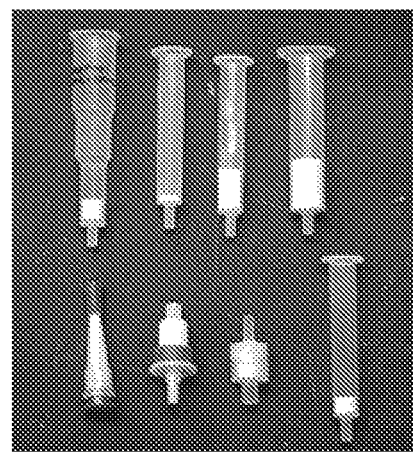
Figure 3:
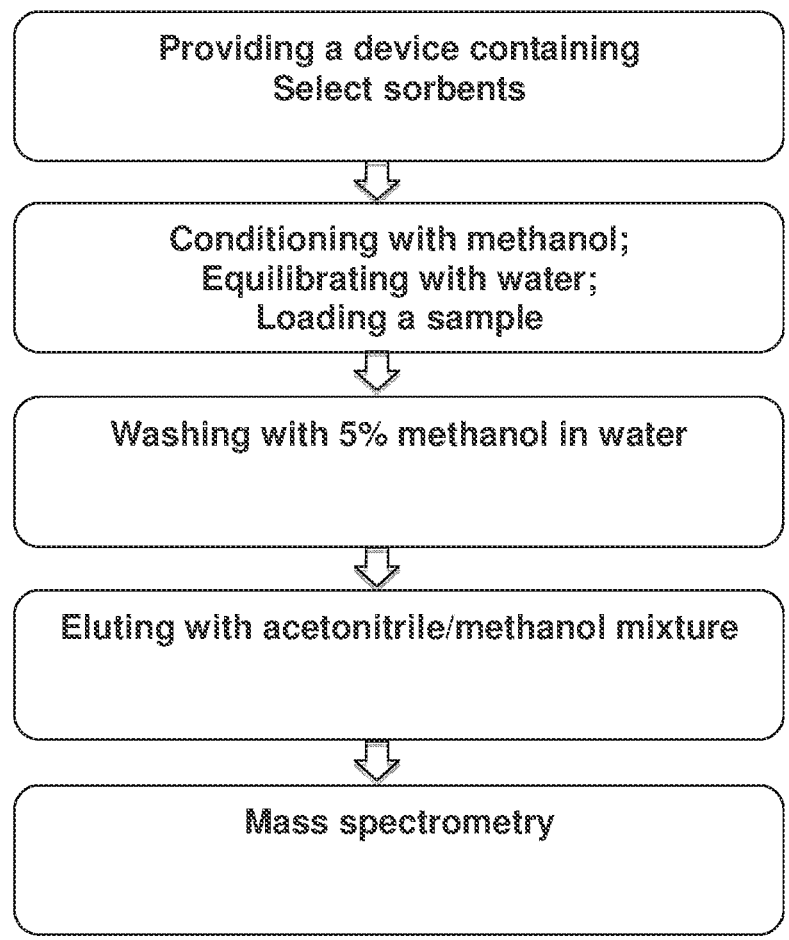
FIG. 3 is an exemplary procedure of analyzing biological sample according to an exemplary embodiment of the present invention.

The present invention provides a device and a method developed for cleaning samples prior to subsequent analysis. Such cleaning may further require the use of separation methods such as liquid chromatography (LC), or supercritical fluid chromatography (SFC) with mass spectrometry/mass spectrometry (MS/MS), mass spectrometry (MS), MALDI-MS or ESI, and the like. As such, devices and methods of the invention can provide high recoveries for analytes and minimize matrix effects by removing interfering matrix materials. In particular, such objects of the present invention may be achieved by combined use of sorbents which provide analyte retention with specificities towards removal of components of MS interferences such as phospholipids, salts and the like from the extracted analytes. The sorbents are selectively combined to provide suitable retention for analytes from aqueous samples without the need to condition or equilibrate the sorbents prior to sample loading thereby reducing the number of steps in the SPE method. Additionally, the sorbent combination is selected to elute polar matrix interferences in the wash step while maintaining analyte retention and to provide adequate retention for at least one matrix interference in the elution step thereby providing removal of multiple interferences from the eluate containing the extracted analytes.

Definitions

The term "analyte" is a component, substance or chemical constituent that is of interest in an analytical procedure. Particular examples may include, but not limited to, drugs, pesticides, herbicides, toxins and environmental pollutants, metal-organic compounds, biologically active compounds such as metabolites, proteins, peptides, hormones, polynucleotides, vitamins, cofactors, metabolites, lipids and carbohydrates.

The term "sample", as used herein, refers to a complex fluid mixture containing soluble and insoluble components. Particular examples include, but are not limited to, food samples (e.g., milk, a fortified food matrix), biological samples including a sample from human or animals (e.g., blood, blood plasma, urine, mucosal tissue secretions, tears, semen, and breast milk) and environmental samples (e.g., ground water, waste waters, soil, and sea, river, pond, or bay water). The sample may further include macromolecules, e.g., substances, such as biopolymers, e.g., proteins, e.g., proteolytic proteins or lipophilic proteins, such as receptors and other membrane-bound proteins, and peptides. The sample may further include one or more lipid, or phospholipid molecules.

The term "matrix" as used herein, refers to the components of a sample other than the analyte of interest. When the analytes are separated, extracted and analyzed, the matrix may have a substantial interference with the analyte during analysis by ESI, or any other technique using nebulization and ionization of sample components prior to detection such as APCI and APPI.

The term "matrix interference" as used herein, refers to those components of the sample that produce a substantial signal enhancement or suppression with the analytes during analysis by mass spectrometry. A substantial signal enhancement or suppression that interferes with analyte quantitation is also termed a substantial interference. In certain embodiments, the "substantial interference" refers to a matrix effect that is greater than 20% for targeted analyses and 50% for screening analyses. Matrix interferences lower than these are considered acceptable if the majority of analytes in an analysis have matrix effect below this threshold.

The term "targeted analysis" as used herein, refers to the analysis of a predetermined set of analytes expected to be present in the samples being analyzed. Targeted analyses typically do not rely on full scan mode data from a MS but from selected ion monitoring of the target ions of interest. An example of a targeted analysis is quantitating Tacrolimus, an immunosuppressive drug used after organ transplants, given to reduce the risk of rejection. A discrete concentration value is reported for these analyses.

The term "screening analysis" as used herein, refers to the analysis of a large grouping of analytes that may or may not be present in the samples being analyzed. An example of a screening analysis is determining if pesticides are present in foods. These reports contain information on the presence of analytes at or above a certain threshold.

The term "log P" as used herein, refers to the octanol:water partition coefficient. The formula for the partition coefficient is Log P=[analyte concentration in octanol]/[analyte concentration in water]. The log P value is used as a measure of an analytes hydrophobicity or hydrophobicity where values of less than 1 indicate that the analyte concentration if higher in water than in octanol. As such the analyte would be considered a more hydrophilic or polar analyte. Log P values greater than 1 indicate that an analyte is more hydrophobic or non-polar. The higher the log P value correlates with a higher hydrophobicity relative to lower values on the same scale. The lower the log P value relative to 1 indicates that the analyte is more hydrophilic or more polar than others of higher value.

The term "matrix effect" or "ME" as used herein, refers to a quantified enhancement or suppression of analyte signal. The matrix effect is calculated for analyte of interest the following formula:

$$\text{Matrix Effects} = \left(\frac{\text{(analyte area counts in the presence of matrix)}}{\text{(analyte area counts in the absence of matrix)}} - 1\right) \times 100\%$$

In certain embodiments, the matrix effect is calculated using the following formula:

$$\text{Matrix Effects} = \left(\left(\frac{\text{Response (post-spiked extracted sample)}}{\text{Response (Solvent standard)}}\right) - 1\right) \times 100\%$$

Matrix effects may be caused by, but not limited to, small molecules, proteins, peptides, polymers, surfactants, particulates, cells, lipids or phospholipids, drug product excipients and salts.

The phrase "solid-phase extraction (SPE) method or protocol" as used herein, refers to a procedure comprising of the following steps:
1. Conditioning: the addition of an organic containing wetting solvent, typically methanol, which is required for the subsequent use of non-water wettable sorbents like Silica C18.
2. Equilibrating the sorbent: the addition of water or buffer to displace the organic solvent used to condition the sorbent for use. The removal of the conditioning solution is required for retention to occur in the following step.
3. Loading the sample: the addition of a sample as received or prepared by dilution and/or, centrifugation or filtration.
4. Washing the sorbent: the addition of a solution able to remove matrix salts, proteins, in particular albumin, and other polar matrix interferences. The polarity of the wash solution is such that retention of analytes of interest on the sorbent is maintained. The wash steps may be repeated multiple times to remove specific interferences.
5. Eluting the analytes: the addition of a solution that elutes the analytes of interest from the sorbent while minimizing the co-elution of matrix interferences.

The term "recovery" as used herein, refers to the amount of analyte recovered from the extracted sample. The calculation used for recovery is shown below:

$$\text{Recovery} = \left(\frac{\text{Pre-spiked sample response}}{\text{Post-spiked sample response}}\right) \times 100\%$$

The language "biological sample" refers to any solution or extract containing a molecule or mixture of molecules that comprises at least one biomolecule that is subjected to extraction or analysis that originated from a biological source (such as, humans and animals). Biological samples are intended to include crude or purified, e.g., isolated or commercially obtained, samples. Biological sample may be, but are not limited to, inclusion bodies, biological fluids, biological tissues, biological matrices, embedded tissue samples, cells (e.g., one or more types of cells), and cell culture supernatants. Particular examples may include blood plasma, urine, cerebrospinal fluid, synovial fluid and other biological fluids, including extracts of tissues, such as liver tissue, muscle tissue, brain tissue and heart tissue and the like.

The language "biological matrices" is intended to include anything that a cell contains or makes, e.g., bone, inclusion bodies, blood components, cell debris, e.g., cell lysates, etc.

The language "biological fluid" as used herein is intended to include fluids that are obtained from a biological source. Exemplary biological fluids include, but are not limited to, blood, blood plasma, urine, spinal fluid, mucosal tissue secretions, tears, interstitial fluid, synovial fluid, semen, and breast milk.

The term "chromatographic" process as used herein refers to a process including a physical method of separation that distributes components to separate between two phases, one stationary (stationary phase), the other (the mobile phase) moving in a definite direction.

The term "eluate" as used herein refers to a mobile phase leaving the sample preparation device or column. In certain embodiments, the eluate may include an analyte of interest or the eluate may not include the analyte which may be retained by a resin or a matrix of the resin. In such instances, the resin or matrix of the resin may be further eluted in a subsequent step to elute the retained analyte of interest.

The term "solid phase extraction (SPE)" refers to a frequently used chromatographic technique for isolating analytes from the sample for quantitative analysis, especially together with high performance liquid chromatography (HPLC) or gas chromatography (GC) (McDonald and Bouvier, eds. Solid Phase Extraction Applications Guide and Bibliography, sixth edition, Milford, Mass.: Waters (1995)). Solid phase extraction can be advantageous to separate a component of interest in a complex solution from potentially interfering elements and to concentrate the target analytes to the level of sufficient detection and measurement. For example, solid phase extraction has been widely utilized in preparing food or beverage samples, environmental samples and pharmaceutical agents or metabolites for analysis.

The term "water-wettable" as used herein, describes a material which is solvated, partially or completely, by water. The water-wettable material engages in energetically favorable or attractive interactions with water molecules, and thus, maintains its capability for high retention and excellent recoveries even if the sorbent runs dry, which means there is no need to take extraordinary steps to keep the sorbent beds from drying out during the critical steps prior to sample loading. Water-wettable materials are exemplified, but not limited to, those described in U.S. Pat. No. 5,882,521. As observed in the examples of U.S. Pat. No. 5,882,521 sorbents that do not engage in favorable energetics or interactions with water require an organic conditioning followed by an aqueous equilibration in order to maintain retention of analytes of interest during sample loading. In certain embodiments, when water-wettable material is solvated partially, less than about 1%, less than about 3%, less than about 5%, less than about 7%, less than about 10%, less than about 15%, less than about 20%, less than about 25%, less than about 30%, less than about 35%, less than about 40%, less than about 45 less than about 50%,%, less than about 55%, less than about 60%, less than about 65%, less than about 70%, less than about 75%, less than about 80%, less than about 85%, less than about 90%, less than about 95%, or less than about 99% of the material may be solvated or wet by water.

The term "monomer", as used herein, refers to both a molecule comprising one or more polymerizable functional groups prior to polymerization, and a repeating unit of a polymer. A polymer can comprise two or more different monomers, in which case it can also be referred to as a copolymer. The "mole percent" of a given monomer which a copolymer comprises is the mole fraction, expressed as a percent, of the monomer of interest relative to the total moles of the various (two or more) monomers which compose the copolymer.

The term "sorption" or "sorbing" describes the ability of a material to take up and hold another material by absorption or adsorption. Without adsorption of matrix components and analytes of interest on the surface of a sorbent material, retention would not be maintained when the system is subjected to the flow of certain fluids.

The term "sorbent" refers to a material or molecule capable of sorption or sorbing. In certain embodiments, the sorbent may adsorb either analytes or other matrix molecules.

As used herein, the term "hydrophobic" refers to a physical or chemical property which repels water or polar molecules. In certain embodiments, the hydrophobic group in a resin makes a substantial interaction or affinity with hydrophobic analytes or matrix in a sample and adsorbs hydrophobic species.

As used herein, the term "hydrophilic" refers to a physical or chemical property which favors water or polar molecules. In certain embodiments, the hydrophilic group in a resin makes a substantial interaction with hydrophilic or polar analytes or matrix in a sample and adsorbs hydrophilic species.

The term "phospholipid" refers to a lipid which contains a phosphate group and one or more of glyceride. The phospholipids are major components of cell membranes in a form of lipid bilayers. Therefore, the phospholipids are mostly included in biological samples and food and other by-products produced from animal products. In certain embodiments, the phospholipids may cause a matrix effect to substantially disturb analytical qualification and quantitation because they may interact or adhere to analytes. As such, it is preferred to remove phospholipid prior to a analysis.

The terms "analysis" or "analyzing" are used interchangeably and refer to any of the various methods of separating, detecting, isolating, purifying, solubilizing, detecting, quantifying and/or characterizing chemical or biological composition. In certain embodiments the analysis may also refer to the various methods of determining the degree of purification of a sample. Examples of the various methods include, but are not limited to, solid phase extraction, solid phase micro extraction, electrophoresis, mass spectrometry, e.g., MALDI-MS or ESI, liquid chromatography, e.g., high performance, e.g., reverse phase, normal phase, or size exclusion, ion-pair liquid chromatography, liquid-liquid extraction, e.g., accelerated fluid extraction, supercritical fluid extraction, microwave-assisted extraction, membrane extraction, soxhlet extraction, precipitation, clarification, electrochemical detection, staining, elemental analysis, Edmund degradation, nuclear magnetic resonance, infrared analysis, flow injection analysis, capillary electrochromatography, ultraviolet detection, and combinations thereof.

The term "mass spectrometric detection" refers to any of the various methods of mass spectroscopy. Examples include, but are not limited to, electrospray ionization (ESI), surface desorption ionization, and atmospheric pressure chemical ionization (APCI). In certain embodiments, mass spectrometric detection also includes the use of a tandem mass spectrometer, a quadrupole time-of-flight mass spectrometer, or a magnetic sector mass spectrometer.

The language "high-purity analyte/sample" refers to a prepared or extracted analyte which may have reduced contamination and/or non-diminished chromatographic properties prior to quantitative or qualitative analysis, such as chromatography and mass spectroscopy.

The term "substantially", as in "substantially higher," "substantially greater" or "substantially improved" as used herein refers to an increase of an effect of about 10%, about 15%, about 20%, about 25%, about 30%, about 35%, about 40%, about 45%, about 50%, about 55%, about 60%, about 65%, about 70%, about 75%, about 80%, about 85%, about 90% or about 95% above the original degree of the particular effect. Alternatively, a "substantial" amount may refer to an amount greater than about 10%, about 15%, about 20%, about 25%, about 30%, about 35%, about 40%, about 45%, about 50%, about 55%, about 60%, about 65%, about 70%, about 75%, about 80%, about 85%, about 90% or about 95% of the initial or total amount. Similarly, "substantially reduced" as used herein refers to a reduction of an effect of about 10%, about 15%, about 20%, about 25%, about 30%, about 35%, about 40%, about 45%, about 50%, about 55%, about 60%, about 65%, about 70%, about 75%, about 80%, about 85%, about 90% or about 95% above the original degree of the particular effect.

As used herein the term "substantially free" as in "substantially free of phospholipids, salts, proteins and other highly polar matrix components" refers to the elution of analytes such that the analytes are eluted in the elution solvent such that the analytes recovered contain a quantity of the recited component of less than 20% by weight of the particular component as compared to the total elution mixture. In certain embodiments, "substantially free" refers to less than 10%, less than 5%, less than 2% less than 1%, less than 0.5% or less than 0.1% by weight of the particular component as compared to the total elution. In certain other embodiments, "substantially free" refers to less t less than 1.0%, less than 0.7%, less than 0.5%, less than 0.4% less than 0.3%, less than 0.2% or less than 0.1% by weight of the particular component as compared to the total elution. In still other embodiments, "substantially free" refers to less than 1.0%, less than 0.7%, less than 0.5%, less than 0.4% less than 0.3%, less than 0.2% or less than 0.1% by weight of the particular component as compared to the total formulation.

Sorbents

The present invention provides devices for preparing high-purity samples and the devices are used in solid phase extraction or pass through methods. In particular, the devices include sorbents which may selectively adsorb or retain matrix components. Further, the devices of the present invention include at least two or more sorbents for solid phase extraction. The sorbents may be provided in a packed sorbent bed.

In one aspect, when a sample is aqueous or contains organic solvent less than about 50% in volume, at least one sorbent may contain at least one hydrophobic component and at least one hydrophilic component. In certain exemplary embodiments, this sorbent may include a water-wettable polymer with an optimal balance between hydrophobic and hydrophilic properties as described in U.S. Pat. Nos. 5,882,521; 5,976,367; 6,106,721; 6,254,780; 6,332,695; 6,468,422; 6,726,842; 6,723,236; and 6,773,583, each of which is incorporated herein by reference in its entirety. Accordingly, the sorbent at least one hydrophobic component and at least one hydrophilic component may maintain high retention in water, an aqueous solution, or water miscible solution to hydrophobic species such as lipids or non-polar organic molecules as well as hydrophilic species such as polar organic molecules or salts. In addition, the retained species in this sorbent may be acidic, basic and neutral compounds. It is also appreciated that a range of option for the sorbent containing at least one hydrophobic component and at least one hydrophilic component is provided by OASIS® HLB (Waters Corporation, Milford Mass.).

In certain embodiments, the sorbent containing at least one hydrophobic component and at least one hydrophilic component may be further modified to include at least one ion exchange functional group. The functional group may be capable of selectively retaining cationic, anionic or other polar species in the solution as described in, for example, U.S. Pat. Nos. 7,442,299; 7,232,520; 7,731,844; 7,790,038; and 8,574,433, each of which is incorporated herein by reference in its entirety. It is also appreciated that a range of option for the sorbent containing at least one hydrophobic component, at least one hydrophilic component and at least ion exchange functional group is also provided by OASIS® MAX sorbent, OASIS® MCX sorbent, OASIS® WCX sorbent or OASIS® WAX sorbent (Waters Corporation, Milford Mass.).

In one embodiment, at least one of the sorbents may contain at least one component which has a specific affinity to lipid or to a lipid-like species. The sorbent may have high hydrophobicity to remove such lipophilic species from the sample solution. In certain exemplary embodiments, the sorbent may have an affinity to phospholipids as described in US Pat. Pub. No. 2013/0053588, which is incorporated herein by reference in its entirety. In an exemplary embodiment, the sorbent may contain highly hydrophobic group such as octadecyl ($C_{18}$) or $C_8$ to $C_{30}$ alkyl which is bonded to silica. Alternatively, this sorbents may be further modified with other chemical group to provide greater specificity towards phospholipids. It is also appreciated that a range of option for the sorbent containing at least one hydrophobic component and at least one hydrophilic component is provided by OSTRO® (Waters Corporation, Milford Mass.).

In certain exemplary embodiments, any number of combinations of the sorbent containing at least one hydrophobic component and at least one hydrophilic component, the sorbent having the affinity to phospholipids and other sorbents based on a user's requirements may be also provided without limitation. In yet certain exemplary embodiments, the sorbents may also be selected from the group consisting of a silica, a modified silica, an alumina, a modified alumina, titanium and zirconium oxides, graphitized carbon or activated carbon, magnesium-silica (Florisil®), a modified polymer and combinations thereof. The sorbents may also be porous, nonporous or pellicular.

In an exemplary embodiment of the invention, at least one of the sorbent may be a porous resin as described in U.S. Pat. No. 5,882,521, which is incorporated herein by reference in its entirety. The porous resin may be formed by copolymerizing of the monomers included in the resin composition and a porous structure may be formed to penetrating the copolymers. The porous structure may provide a pathway or a channel through which the solution of sample can diffuse. In certain exemplary embodiments, the sorbent containing at least one hydrophobic component and at least one hydrophilic component may be formed by copolymerizing of at least one hydrophobic monomer and at least one hydrophilic monomer. In yet certain exemplary embodiments, pores in the resin may have a diameter ranging from about 0.5 nm to about 100 nm. In still certain exemplary embodiments, the porous resin may be in a form of a porous particle or monolith.

In certain exemplary embodiments, the sorbents may be layered and thus at least two or more layers may be formed in the devices. In an exemplary embodiment, the sorbent containing at least one hydrophobic component and at least one hydrophilic component may be layered on the top of the sorbents layers. Other layers comprising the sorbent having affinity to phospholipids or the like may be layered at the bottom or underneath the top layer without limitation. However, the order or the number of the layer may not be limited within the scope of the invention.

In an exemplary embodiment, each sorbent may be independently used in an amount of about 0.1 mg, about 0.2 mg, about 0.3 mg, about 0.4 mg, about 0.5 mg, about 0.6 mg, about 0.7 mg, about 0.8 mg, about 0.9 mg, about 1 mg, about 2 mg, about 3 mg, about 4 mg, about 5 mg, about 6 mg, about 7 mg, about 8 mg, about 9 mg, about 10 mg, about 20 mg, about 30 mg, about 40 mg, about 50 mg, about 60 mg, about 70 mg, about 80 mg, about 90 mg, or about 100 mg, without limitation, based on a user's requirements, a capacity of device, a volume of a solution sample, amounts of phospholipids and salts and the like.

In an exemplary embodiment, the sorbents in each layer may be used in a particular weight ratio therebetween. For instance, the weight ratio between the sorbent containing at least one hydrophobic component and at least one hydrophilic component and the sorbent having affinity to phospholipids may be about 10:1, about 9:1, about 8:1, about 7:1, about 6:1, about 5:1, about 4:1, about 3:1, about 2:1, about 1:1, about 1:2, about 1:3, about 1:4, about 1:5, about 1:6, about 1:7, about 1:8, about 1:9 or about 1:10. In particular, the sorbent containing at least one hydrophobic component and at least one hydrophilic component and the sorbent having a specific affinity to phospholipid may be mixed at a weight ratio of about 1:2, respectively.

The suitable weight ratios between sorbents of the layered bed may vary for sorbents of different densities. For example, OASIS® HLB sorbent as the sorbent containing at least one hydrophobic component and at least one hydrophilic component has a density of about 1.2 g/cubic centimeter; and OSTRO® sorbent as the sorbent having a specific affinity to phospholipid has a density of about 2.2 g/cubic centimeter. Accordingly, the suitable weight ratio between two different sorbents may be determined by the volumetric requirement in the chromatographic column or device, or the like.

Further, the suitable weight ratios may be determined to provide retention for the analytes to be quantitated and to provide adequate retention for phospholipids in the elution solvent such that the analytes are eluted in the elution solvent substantially free of phospholipids, salts, proteins and other highly polar matrix components that cause ion suppression or enhancement of mass spectrometric analyses or compromise the lifetime of the analytical column used in front of the mass spectrometer for analyte resolution prior to quantitation. For example, after a first washing, a second washing, or eluting with mobile phases, majority of phospholipids may remain in the sorbent having a specific affinity to phospholipid to provide adequate retention for phospholipids in the elution solvent such that the analytes may be eluted in the elution solvent substantially free of phospholipids. In addition, after eluting, other highly polar matrix components such as salts, proteins and the like that cause ion suppression or enhancement of mass spectrometric analyses may remain in the sorbent containing at least one hydrophobic component and at least one hydrophilic component or water-wettable sorbent to provide adequate retention thereof such that the analytes eluted in the elution solvent may be substantially free of the polar matrix components.

Alternatively, in certain exemplary embodiments, the sorbents may be mixed and formed in a single layer or a single packed bed. In an exemplary embodiment, the sorbents may be prepared by mixing a sorbent containing at least one hydrophobic component and at least one hydrophilic component and a sorbent having affinity to phospholipids. The mixture of the sorbents may be formed homogenously, partially homogenously, or heterogeneously (randomly mixed). In addition, the mixture of the sorbents may be formed with gradient of one sorbent or with independent gradient of each sorbent. The mixed sorbent bed may be used to reduce a backpressure of sorbent beds composed of sorbent particles. In other words, the mixed beds may be charge-stabilized or in-situ formed monoliths, such that aqueous flow rate may be improved, while the backpressure is reduced. For example, backpressure of the mixed sorbents in a single layer led may be about 5" Hg of vacuum compared to the 8-15" Hg for the layered beds using same sorbents.

In an exemplary embodiment, each sorbent may be mixed in an amount of about 0.1 mg, about 0.2 mg, about 0.3 mg, about 0.4 mg, about 0.5 mg, about 0.6 mg, about 0.7 mg, about 0.8 mg, about 0.9 mg, about 1 mg, about 2 mg, about 3 mg, about 4 mg, about 5 mg, about 6 mg, about 7 mg, about 8 mg, about 9 mg, about 10 mg, about 20 mg, about 30 mg, about 40 mg, about 50 mg, about 60 mg, about 70 mg, about 80 mg, about 90 mg, or about 100 mg, without limitation, based on a user's requirements, a capacity of device, a volume of a solution sample, amounts of phospholipids and salts and the like.

In an exemplary embodiment, the sorbents may be mixed to form a single layer a single absorbent in a particular weight ratio therebetween. For instance, the weight ratio between the sorbent containing at least one hydrophobic component and at least one hydrophilic component and the sorbent having affinity to phospholipids may be about 10:1, about 9:1, about 8:1, about 7:1, about 6:1, about 5:1, about 4:1, about 3:1, about 2:1, about 1:1, about 1:2, about 1:3, about 1:4, about 1:5, about 1:6, about 1:7, about 1:8, about 1:9 or about 1:10. In particular, the sorbent containing at least one hydrophobic component and at least one hydrophilic component and the sorbent having a specific affinity to phospholipid may be mixed at a weight ratio of about 1:2, respectively. However, an order or a method of mixing may not be limited within the scope of the invention.

The suitable weight ratios between sorbents of the mixed bed may vary for sorbents of different densities. For example, OASIS® HLB sorbent as the sorbent containing at least one hydrophobic component and at least one hydrophilic component has a density of about 1.2 g/cubic centimeter; and OSTRO® sorbent as the sorbent having a specific affinity to phospholipid has a density of about 2.2 g/cubic centimeter. Accordingly, the suitable weight ratio between two different sorbents may be determined by packing volume, back pressure, other volumetric requirement in the chromatographic column or device, or the like.

Further, the suitable weight ratios may be determined to provide retention for the analytes to be quantitated and to provide adequate retention for phospholipids in the elution solvent such that the analytes are eluted in the elution solvent substantially free of phospholipids, salts, proteins and other highly polar matrix components that cause ion suppression or enhancement of mass spectrometric analyses or compromise the lifetime of the analytical column used in front of the mass spectrometer for analyte resolution prior to quantitation. For example, after a first washing, a second washing, or eluting with mobile phases, majority of phospholipids may remain in the sorbent having a specific affinity to phospholipid to provide adequate retention for phospholipids in the elution solvent such that the analytes may be eluted in the elution solvent substantially free of phospholipids. In addition, after eluting, other highly polar matrix components such as salts, proteins and the like that cause ion suppression or enhancement of mass spectrometric analyses may remain in the sorbent containing at least one hydrophobic component and at least one hydrophilic component or water-wettable sorbent to provide adequate retention thereof such that the analytes eluted in the elution solvent may be substantially free of the polar matrix components.

In another aspect, when a sample is non-aqueous or contains organic solvent greater than about 50% in volume, the sorbent containing at least one hydrophobic component and at least one hydrophilic component or the water-wettable adsorbent may not be required thereby eliminating the need for a hydrophilic component but a still at least one of the sorbents may contain at least one component which has a specific affinity to lipid or to a lipid-like species. In an exemplary embodiment, when the sample is non-aqueous or contains organic solvent greater than about 50% in volume, the sorbent having a specific affinity to phospholipids or to a lipid-like species may be used in combination with a non-polar sorbent, such as high coverage $C_{18}$-silica and divinylbenzene sorbents, and those sorbents may be mixed in a single layer or singly packed sorbent bed, or may be provided in each layer to provide layered sorbent beds. Amounts and weight ratio of the sorbents for the non-aqueous sample may be used as described above without limitation.

Device

The present invention provides devices for preparing high-purity samples and the devices are used in solid phase extraction. The devices disclosed in the present invention may include: an inlet, outlet and sorbents and a housing which is capable of confining the sorbents and withstands sufficient mechanical strength applied during the extraction.

In one aspect, a separation device comprises at least two or more sorbents provided in a packed sorbent bed.

In one embodiment, the device may include: at least one water-wettable sorbent containing at least one hydrophobic component and at least one hydrophilic component; and at least one sorbent having affinity to lipid or to a lipid-like species such as phospholipids, as described above. Alternatively, when a sample is non-aqueous or contains organic solvent greater than about 50% in volume, the device may include: a non-polar sorbent and at least one sorbent having affinity to lipid or to a lipid-like species such as phospholipids. Most non-polar sorbents used for SPE are wettable by solutions containing great than about 50% organic solvent.

In certain embodiments, the sorbent containing at least one hydrophobic component and at least one hydrophilic component may be further modified to include at least one ion exchange functional group. In yet certain exemplary embodiments, any number of combinations of the sorbent containing at least one hydrophobic component and at least one hydrophilic component, the sorbent having the affinity to phospholipids and other sorbents may be also provided based on a user's requirements without limitation. Exemplary sorbents may also be selected from the group consisting of a silica, a modified silica, an alumina, a modified alumina, titanium and zirconium oxides, graphitized carbon or activated carbon, magnesium-silica (Florisil®), a modified polymer and combinations thereof. The sorbents may also be porous, nonporous or pellicular.

In certain exemplary embodiments, the sorbents provided as a packed sorbent bed may be layered and thus at least two or more layers may be formed. For example, the sorbent containing at least one hydrophobic component and at least one hydrophilic component may be layered on the top of the sorbents layers. Other layers comprising the sorbent having affinity to phospholipids or the like may be layered at the bottom or underneath the top layer without limitation. However, the order or the number of the layer may not be limited within the scope of the invention.

In still certain exemplary embodiments, the sorbents may be mixed and provided in a single layer or a single packed bed. For example, the sorbents may be prepared by mixing a sorbent containing at least one hydrophobic component and at least one hydrophilic component and a sorbent having affinity to phospholipids. The mixture of the sorbents may be formed homogenously, partially homogenously, or heterogeneously (randomly mixed). In addition, the mixture of the sorbents may be formed with gradient of one sorbent or with independent gradient of each sorbent.

In certain exemplary embodiments, each sorbent in the device may be independently included in an amount of about 0.1 mg, about 0.2 mg, about 0.3 mg, about 0.4 mg, about 0.5 mg, about 0.6 mg, about 0.7 mg, about 0.8 mg, about 0.9 mg, about 1 mg, about 2 mg, about 3 mg, about 4 mg, about 5 mg, about 6 mg, about 7 mg, about 8 mg, about 9 mg, about 10 mg, about 20 mg, about 30 mg, about 40 mg, about 50 mg, about 60 mg, about 70 mg, about 80 mg, about 90 mg, about 100 mg, or about 1 g, without limitation, based on a user's requirements, a capacity of the device, a capacity of the sorbents used, a volume of a solution sample, amounts of phospholipids and salts and the like.

Each sorbent in the device may be included in the layered and mixed sorbent bed in a particular weight ratio therebetween. For instance, the weight ratio between the sorbent containing at least one hydrophobic component and at least one hydrophilic component and the sorbent having affinity to phospholipids may be about 10:1, about 9:1, about 8:1, about 7:1, about 6:1, about 5:1, about 4:1, about 3:1, about 2:1, about 1:1, about 1:2, about 1:3, about 1:4, about 1:5, about 1:6, about 1:7, about 1:8, about 1:9 or about 1:10. In particular, the sorbent containing at least one hydrophobic component and at least one hydrophilic component and the sorbent having a specific affinity to phospholipid may be mixed at a weight ratio of about 1:2, respectively. This weight ratio is based on matching the capacity of the sorbent containing at least one hydrophobic component and at least one hydrophilic component for the phospholipids that are removed by the sorbent having a specific affinity to phospholipid. However, an order or a method of mixing may not be limited within the scope of the invention.

The suitable weight ratios between the sorbents may vary for sorbents of different densities. For example, OASIS® HLB sorbent as the sorbent containing at least one hydrophobic component and at least one hydrophilic component has a density of about 1.2 g/cubic centimeter; and OSTRO® sorbent as the sorbent having a specific affinity to phospholipid has a density of about 2.2 g/cubic centimeter. Accordingly, the suitable weight ratio between two different sorbents may be determined by packing volume, back pressure, other volumetric requirement in the chromatographic column or device, or the like.

Further, the suitable weight ratio between the sorbents may be determined by a balance of retention of the analytes during sample loading and washing and the persistence of retention of phospholipids during the elution of analytes in the eluate. For example, after a first washing, a second washing, or a third washing, the majority of phospholipids may remain in the mixed sorbent bed. A suitable weight ratio between the sorbents provides adequate retention for phospholipids in the elution solvent such that the analytes may be eluted in the elution solvent substantially free of phospholipids. In addition, other highly polar matrix components such as salts, proteins and the like that cause ion suppression or enhancement of mass spectrometric analyses may either remain in the mixed sorbent or be removed by washing while providing adequate mass capacity and retention thereof such that the analytes eluted in the elution solvent may be substantially free of the polar matrix components.

For pass through applications the sorbent weight ratios are determined by the required mass capacity to remove at least two major matrix inferences.

In one embodiment, the device may further include a housing. The housing, as used herein, may have a chamber for accepting sorbents or a sorbent bed comprising sorbents of the invention. The housing in the present invention may also be used for a chromatographic column or device without limitation.

In certain exemplary embodiments, the housing of the devices may be a single chamber or the housing has a plurality of chambers. In addition, the housing may also be constructed and arranged to present the chambers in a plate-like format as described in US Pub. No.: US 2013/0053588 A1 and U.S. Pat. No. 6,723,236, each of which is incorporated herein by reference in its entirety. In yet certain exemplary embodiments, the housing may be, but are not limited to, a syringe, a cartridge, a column, a multiple chamber, a 8-well rack, a 8-well strip, a 96-well plate, 96-well micro-elution plate, micro-elution tip, a 96-micro-elution tip array, an 8-tip micro-elution strip, a single micro-elution pipet tip, a spin tube or a spin container. However, any number of chambers or shape of the chambers may be obtained based upon a user's requirements.

In certain embodiments, a solution received in the housing may flow into the sorbent bed spontaneously, for example, by capillary action. Alternatively, the flow may be generated through the device by external forces, such as gravity, a vacuum chamber, reservoir or a structure to allow for use in a centrifuge, or with a vacuum or pressure source, external pressure and the like, without limitation.

In certain exemplary embodiments, the housing may be configured to have at least one cap or lid for closing the housing after the sample is received. Also, the cap may provide a pressure source for efficient extraction process. In certain yet exemplary embodiments, the cap may be associated with a vacuum chamber, reservoir or a structure to allow for use in a centrifuge, or with a vacuum or pressure source to apply vacuum or suction to facilitate flow out of the solution or liquid throughout the device to the outlet. In particular, a vacuum chamber, reservoir or a structure to allow for use in a centrifuge or with a vacuum or pressure source may also be associated with other component of the housing without limitation, as known in the art.

In certain exemplary embodiments, the housing may be formed of a substantially rigid material withstands sufficient mechanical strength applied during the extraction. Exemplary materials may be, but not limited to, a glass, a metal, a plastic and the like. In an exemplary embodiment, the molded plastic such polyether ether ketone (PEEK), polycarbonate (PC), and the like may be used without limitation, as known in the art.

In certain exemplary embodiments, a capacity of the house may be various according to the volume of the sorbents, samples and the like based on a user's requirements. Exemplary housings of the invention may have a capacity of about 1 mL, about 2 mL, about 3 mL, about 4 mL, about 5 mL, about 6 mL, about 7 mL, about 8 mL, about 9 mL, about 10 mL, about 15 mL, about 20 mL, about 30 mL, about 40 mL, about 50 mL, or about 100 mL, without limitation.

In one embodiment, the device may further include an inlet or an outlet.

In one embodiment, the device of the invention may include one or more of frits or filters. For instance, a frit or a filter may be disposed at the bottom of the sorbents or a frit or a filter may be disposed on the top of the sorbents. The frits or filters, as used herein, may maintain stabilization or equilibration the sorbents until sufficient flow is generated through the device. In other words, the frits or filters may prevent the sorbents from being penetrated by the sample solution until a sufficient external force is applied. In certain exemplary embodiments, a porous frit may be used. Exemplary fits may be, but not limited to, a hydrophobic frit material such as Teflon, which may be in a form of membrane, filter, screen or monolithic structure or combination thereof. In yet certain exemplary embodiments, frits may not be disposed in the sorbents. In other certain exemplary embodiments, frits may be disposed between layers of sorbents, without limitations to number or orders.

In an exemplary embodiment, the device of the present invention may comprise: a sorbent bed comprising at least two sorbents, a housing, a frit at the bottom of the sorbent bed; an inlet and outlet. In particular, at least one sorbent may contain at least one hydrophobic component and at least one hydrophilic component and at least one sorbent may have an affinity to phospholipids, to thereby efficiently remove salts and phospholipids from the sample solution and eliminate matrix effects.

In various exemplary embodiments of the present invention, the device can be used to separate and eliminate interfering species such as phospholipids and salts from analytes of the sample solution by using combinations of the sorbents. In other words, matrix effects can be minimized. Further, the analytes in the sample may be recovered at high recovery rates and be provided in a concentrated solution. As such, the analytes in the concentrated solution may not require additional clean-up process prior to further analytical methods, such as liquid chromatography, liquid chromatography-mass spectrometry/mass spectrometry (LCMS/MS), mass spectrometry (MS), MALDI-MS or ESI and the like. In certain exemplary embodiments, the analytes may be, but not limited to, small molecules, proteins, peptides, nucleic acids, oligonucleotides, and/or other compounds.

Method

In another aspect, the present invention may provide an improved solid-phase extraction method by using the devices of the invention which may have various advantages over conventional protein precipitation (PPT) and solid liquid extraction (SLE). In particular, the methods in the present invention may significantly reduce matrix effects which can be generally caused by salts, phospholipids, small molecules, proteins, peptides, particulates, cells, and salts and the like.

In one embodiment, the methods may include the use of separation devices of the present invention. In particular, the device includes at least one sorbent may contain at least one hydrophobic component and at least one hydrophilic component and at least one sorbent having affinity to lipid or to a lipid-like species such as phospholipids, as described above. Further, the sorbent that contains at least one hydrophobic component and at least one hydrophilic component may be water-wettable. In yet certain exemplary embodiments, any number of combinations of the sorbent containing at least one hydrophobic component and at least one hydrophilic component, the sorbent having the affinity to phospholipids and other sorbents based on a user's requirements may be also provided without limitation. Various other exemplary sorbents used in the methods of the present invention are also described above.

In an exemplary embodiment, the device further includes: an inlet, an outlet and/or a housing which is capable of confining the sorbents and withstands sufficient mechanical strength applied during the extraction. For example, the device may include: a housing; an inlet; an outlet; at least one or more of frits; and at least two or more sorbents and the housing may be, but are not limited to, a syringe, a cartridge, a column, a multiple chamber, a 4 to 8-well rack, a 4 to 8-well strip, a 48 to 96-well plate, a 96 to 384-well micro-elution plate, micro-elution tip, a 96 to 384-micro-elution tip array, a 4 to 8-tip micro-elution strip, a single micro-elution pipet tip, a spin tube or a spin container. Various non-limiting exemplary devices used in the methods of the present invention are described above.

In an exemplary embodiment, the SPE method may include: providing a device; conditioning sorbents in the device; equilibrating the sorbents; loading a sample to the sorbents; washing the sorbents; eluting analytes from the sorbents. Alternatively, when the sorbent that contains at least one hydrophobic component and at least one hydrophilic component is water-wettable, conditioning and equilibrating may not be performed before loading samples.

In certain exemplary embodiments, the conditioning may be performed with methanol, ethanol, propanol, isopropyl alcohol, water and a mixture thereof.

In certain exemplary embodiments, the equilibrating solution may have similar or same ionic strength with the sample solution to provide equilibrated partitioning environments in the sorbents when the sample solution is loaded. Exemplary equilibrating solution/solvent may be, but not limited to, water, a buffer solution such as phosphate buffer solution ($H_3PO_4$ solution), aqueous solution, water-miscible organic solution and the like.

In an exemplary embodiment, the conditioning of the sorbent bed may be performed with methanol and the sorbent bed may also be equilibrated subsequently with water.

The sample may be loaded onto the sorbents as a solution. In certain exemplary embodiments, the sample solution may be an aqueous solution or a water-miscible organic solution. In yet certain exemplary embodiments, the sample may be in a solid form, such as pellets, lyophilized solid, powder, film and the like. The solid type sample may be prepared in an appropriate solution using water, buffer solution, or other organic water-miscible solvent prior solution prior to loading. The solid type sample may further be prepared in a homogeneous solution by using generally known techniques in the art, such as vortexing, ultrasonication, shaking, and the like. The prepare samples may contain analytes subjected to further analytical methods, such as mass spectrometry (MS), chromatography, MALDI-MS, ESI and the like.

In certain exemplary embodiments, the sample may be a biological sample. Exemplary biological samples may be, but not limited to, inclusion bodies, biological fluids, biological tissues, biological matrices, embedded tissue samples, cells (e.g., one or more types of cells), and cell culture supernatants. Particular examples may include blood plasma, urine, cerebrospinal fluid, synovial fluid and other biological fluids, including extracts of tissues, such as liver tissue, muscle tissue, brain tissue and heart tissue and the like. The biological samples may be appropriately prepared prior to loading to the sorbents using generally known techniques in the art without limitation.

In one embodiment, the sorbents may be washed with an appropriate washing solvent. In certain exemplary embodiments, the solvent may be the same solvent used in the conditioning step. Exemplary solvents for washing may be, but not limited to, methanol, ethanol, propanol, isopropyl alcohol, water and a mixture thereof.

In one embodiment, the analytes may be eluted with an appropriate eluting solution. In certain exemplary embodiments, the eluting solution may be a neutral, acidic, or basic mixture of acetonitrile and methanol; a neutral, acidic, or basic solution of methanol; a neutral, acidic, or basic solution of acetonitrile; a neutral, acidic, or basic mixture of methanol and water, a neutral, acidic, or basic mixture of acetonitrile and water; any of the above as a mixture of acetone or neutral, acidic, or basic solution of acetone.

In one embodiment, the method may further comprise analyzing the analytes from the SPE using analytical instruments and/or techniques, for examples, liquid chromatography, LC-MS/MS, mass spectrometry, MALDI-MS, ESI-MS, UHPLC, HPLC, nuclear magnetic resonance, infrared analysis, flow injection analysis, capillary electrochromatography, ultraviolet detection or a combination thereof. In certain exemplary embodiments, analyzing and identification of the analytes may be performed by mass spectrometry. In yet certain exemplary embodiments, the mass spectrometry analysis may be obtained by comparing peaks with known compounds in a computer database.

According to various exemplary embodiments, the methods using the device of the invention may provide efficiently cleaned biological sample analytes for analysis using liquid chromatography (e.g. UHPLC, HPLC), liquid chromatography-mass spectrometry/mass spectrometry (LC/MS-MS), mass spectrometry (MS), MALDI-MS or ESI, and the like. In certain exemplary embodiments, an eluate obtained after eluting the analytes contains less than about 10 wt %, about 9 wt %, about 8 wt %, about 7 wt %, about 6 wt %, about 5 wt %, about 4 wt %, about 3 wt %, about 2 wt %, or about 1 wt % of phospholipids included in the sample. Moreover, a broad range of analytes may be recovered at greater than about 90%, about 91%, about 92%, about 93%, about 94%, about 95%, about 96%, about 97%, about 98%, about 99%, or about 100%. Alternatively, the matrix effects may be reduced to less than about 20%, about 19%, about 18%, about 17%, about 16%, about 15%, about 14%, about 13%, about 12%, about 11%, about 10%, about 9%, about 8%, about 7%, about 6%, about 5%, about 4%, about 3%, about 2%, about 1% as compared to methods without using the devices of the invention.

EXAMPLES

The following examples illustrate the invention and are not intended to limit the scope of the invention.
Experimental Conditions for Sample Analysis:

Unless otherwise specified, the LC-MS/MS or LC-MS data in the examples were generated using the conditions below. Analyte concentrations, characteristics and abbreviations are contained below unless otherwise specified.

(1) LC Conditions:
LC System: ACQUITY UPLC I-Class, Fixed Loop Injector, 2 µL loop
Detection: Xevo TQ-S
Column: ACQUITY UPLC CSH C18, 2.1×100 mm, 1.7 µm (PN
  Mobile Phase A: 0.1% formic acid in water (v/v)
  Mobile Phase B: 0.1% formic acid in acetonitrile (v/v)
  Flow Rate: 500 µL/min
  The solvent gradient table is shown below:

| Time  | Profile | | |
|-------|------|------|-------|
| (min) | % A  | % B  | Curve |
| 0     | 80   | 20   |       |
| 0.3   | 80   | 20   | 6     |
| 3     | 70   | 30   | 6     |
| 6.5   | 30   | 70   | 6     |
| 6.6   | 80   | 20   | 6     |
| 7     | 80   | 20   | 6     |

Column Temp.: 40° C.
Sample Temp.: 10° C.
Injection Volume: 1 µL
Strong Needle Wash: 70/30 ACN/water with 2% formic acid
Weak Needle Wash: 70/30 ACN/water with 2% formic acid
Injection Mode: Partial loop with needle overfill
Vials/plates: 1 cc 96 well collection plate (PN 186002481)
(2) MS Conditions:
MS System Waters Xevo TQ-S Conditions, ESI+
Capillary Voltage: 2.5 kV
Desolvation Temp: 500° C.
Cone Gas Flow: 150 L/Hr
Desolvation Gas Flow: 1000 L/Hr
MRM transition monitored: See table below
Exemplary MRM transition monitored by ESI is shown below:

| Analyte | Precursor Ion m/z | Product Ion m/z | Cone Voltage (V) | Collision Energy (eV) |
|---|---|---|---|---|
| Azidothymidine | 268.08 | 127.10 | 22 | 8 |
| 7-Hydroxycoumarin | 163.06 | 107.06 | 58 | 20 |
| Phenacetin | 180.13 | 110.06 | 26 | 20 |
| Betamethasone | 393.17 | 373.15 | 32 | 8 |
| Protriptyline | 264.20 | 155.08 | 46 | 20 |
| Alprazolam | 309.11 | 281.17 | 38 | 26 |
| Amitriptyline | 278.22 | 91.04 | 44 | 22 |
| Naproxen | 231.12 | 185.06 | 20 | 16 |
| Propranolol | 260.19 | 116.15 | 48 | 16 |

Figure 8:
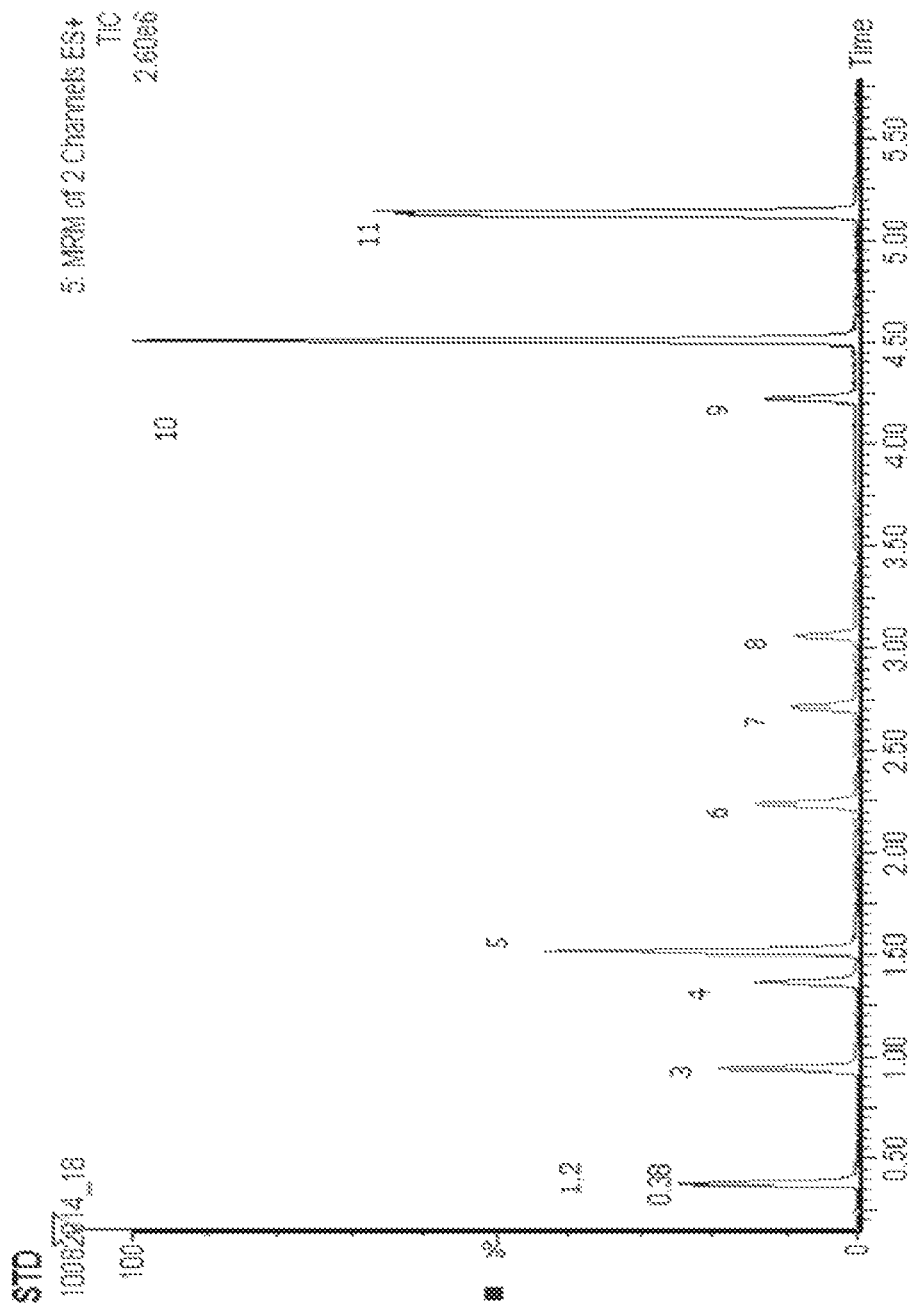
FIG. 8 shows an exemplary MRM transition monitored by ESI.

In addition, an exemplary chromatography for this method is shown in FIG. 8
(3) MS Parameters for Phospholipds are shown below.

| Precursor Ion (m/z) | Product Ion (m/z) | Cone Voltage (V) | Collison Energy (eV) | Phospholipid Class |
|---|---|---|---|---|
| 496.40 | 184.40 | 35 | 30 | Lyso-phosphatidylcholine 16:0 |
| 520.40 | 184.40 | 35 | 30 | Lyso-phosphatidylcholine 18:2 |
| 522.40 | 184.40 | 35 | 30 | Lyso-phosphatidylcholine 18:1 |
| 524.40 | 184.40 | 35 | 30 | Lyso-phosphatidylcholine 18:0 |
| 704.40 | 184.40 | 35 | 30 | Sphingomyeline 34:1 ($C_{13}$ isotope) |

-continued

| Precursor Ion (m/z) | Product Ion (m/z) | Cone Voltage (V) | Collison Energy (eV) | Phospholipid Class |
|---|---|---|---|---|
| 758.40 | 184.40 | 35 | 30 | Phosphatidylcholine 34:2 |
| 760.40 | 184.40 | 35 | 30 | Phosphatidylcholine 34:1 |
| 784.40 | 184.40 | 35 | 30 | Phosphatidylcholine 36:3 |
| 786.40 | 184.40 | 35 | 30 | Phosphatidylcholine 36:2 |
| 806.40 | 184.40 | 35 | 30 | Phosphatidylcholine |
| 808.40 | 184.40 | 35 | 30 | Phosphatidylcholine |

Analyte concentrations, characteristics, and therapeutic relevance.

| | Analyte | $pK_a$ | Log P | Sample Concentration ng/mL | Comments |
|---|---|---|---|---|---|
| 1B | Azidothymidine (AZT) | 9.68 | 0.05 | 127 | Antiretroviral drug for HIV/AIDS |
| 2B | 7-Hydroxycoumarin (7 HC) | 7.8 | 1.6 | 13 | Gradient in sunscreen, absorb UV |
| 3A | Phenacetin (Phen) | 2.2 | 1.6 | 1.3 | Pain, fever reducer |
| 4N | Betamethasone (BetaMeth) | — | 1.1 | 13 | Anti-inflammatory and immunosuppressive |
| 5B | Protriptyline (Protrip) | 8.2 | 4.4 | 2.5 | Antidepressant |
| 6A | Alprazolam (Alpraz) | 2.4 | 4.9 | 5.1 | Panic and anxiety disorders |
| 7B | Amitriptyline (Amitrip) | 9.7 | 4.8 | 3.8 | Antidepressant |
| 8A | Naproxen (Naprox) | 4.2 | 3.2 | 25 | Pain, fever reducer |
| 9B | Propranolol (Propra) | 9.5 | 2.5 | 2.5 | Hypertension |

Reagents
Formic acid 88% from J T Baker. All other reagents and solvents were purchased from Sigma-Aldrich unless otherwise specified.

Example 1

μElution Plate with the Layered Invention Sorbent Combination

A μElution plate was prepared in which each well contained 2 mg of OSTRO® sorbent in the bottom and 1 mg of 30 μm OASIS® HLB layered on top. This inventive sorbent plate was compared to a commercially available plate of the same format from Waters Corporation (pn 186001828BA containing 2 mg of HLB).

A 400 μL aliquot of diluted human plasma (1:1 with 4% $H_3PO_4$) was loaded on the μElution plate containing the inventive sorbent combination or HLB. The loaded samples were washed using 400 μL of 5% methanol in water, and eluted under the optimized conditions for analyte recovery and phospholipid removal for the aforementioned sorbent combination by using a mixture of acetonitrile:methanol (90:10) as the elution solution.

As shown in the Tablet below average recoveries and standard deviations are comparable to the commercially available plate containing only OASIS® HLB. The amount of phospholipids in the extracted analyte samples were compared to the HLB plate and 1:3 plasma:acetonitrile PPT supernatant in Table 2. The plate of the invention had from 74% to 93% lower phospholipids than the commercially available plate and from 95.7 to 99.8% lower phospholipids than a 1:3 PPT supernatant. This example demonstrates that for a wide range of analytes recoveries and standard deviations remain equivalent to a commercially available plate and a substantial reduction in phospholipids is achieved.

TABLE 1

Analyte recovery and standard deviation (STD) comparisons.

| n = 4 | μElution Plate - Invention | | μElution Plate - 2 mg HLB | |
|---|---|---|---|---|
| Analytes | % Recovery | STD | % Recovery | STD |
| AZT | 79.2 | 5.2 | 91.3 | 6.5 |
| Propra | 100.6 | 7.0 | 94.6 | 6.5 |
| 7HC | 104.4 | 7.4 | 92.1 | 7.2 |
| Phen | 106.3 | 8.1 | 95.9 | 7.2 |
| Protrip | 100.2 | 7.3 | 95.0 | 7.6 |
| Amitrip | 102.4 | 6.7 | 95.7 | 6.9 |
| BetaMeth | 101.6 | 7.5 | 93.0 | 6.1 |
| Alpraz | 89.4 | 4.8 | 90.0 | 5.5 |
| Naprox | 101.9 | 8.3 | 86.1 | 7.7 |
| Average | 98.5 | 6.9 | 92.6 | 6.8 |

TABLE 2

Phospholipid removal comparisons

| Phospholipid m/z | μElution Plate | | | % Lower PL (1-Invention/reference)*100 | |
|---|---|---|---|---|---|
| | Invention | 2 mg HLB | 1:3 PPT | Invention/HLB | Invention/(1:3 PPT) |
| 496 | 2,722,750 | 14,038,360 | 34,304,058 | 80.6 | 97.4 |
| 520 | 1,363,477 | 9,247,625 | 10,609,688 | 85.3 | 95.7 |
| 522 | 624,840 | 7,496,313 | 9,892,575 | 91.7 | 97.9 |
| 524 | 1,155,293 | 17,163,636 | 45,388,338 | 93.3 | 99.2 |
| 704 | 7,029 | 45,448 | 721,854 | 84.5 | 99.7 |
| 758 | 70,070 | 328,100 | 14,072,629 | 78.6 | 99.8 |
| 760 | 7,231 | 31,113 | 1,167,733 | 76.8 | 99.8 |
| 784 | 12,250 | 50,637 | 2,414,771 | 75.8 | 99.8 |
| 786 | 14,286 | 55,037 | 2,025,208 | 74.0 | 99.8 |
| 806 | 3,773 | 21,881 | 597,817 | 82.8 | 99.8 |
| 808 | 2,477 | 9,792 | 490,275 | 74.7 | 99.8 |

Example 2

Inventive Sorbent Comparisons in 1 cc Devices

This example demonstrates that the layered version of the invention provides comparable recoveries to an HLB only 1 cc cartridge whether the layered selected sorbents are separated by a frit or not. However, the invention 1 cc cartridges that are separated by a frit, as commonly done with multi-sorbent devices shows substantially higher relative standard deviations (RSD) compared to the other configurations.

Devices
  Three device formats are prepared using 1 cc cartridges. Each format is configured as follows.
  Device 1: (top) a frit-OASIS® HLB in an amount of about 10 mg-frit (bottom)
  Device 2: (top) a frit-OASIS® HLB in an amount of about 10 mg-OSTRO® in an amount of about 10 mg-frit (bottom)
  Device 3: (top) a frit-OASIS® HLB in an amount of about 10 mg—(frit)—OSTRO® in an amount of about 10 mg-frit (bottom)

Procedure

Solid phase extraction was performed with each device of 1 cc cartridge. The sorbents in each cartridge as describe above were conditioned with methanol in an amount of about 400 μL and equilibrated with water in an amount of about 400 μl. After equilibration, a sample of 400 μL containing plasma and 4% by volume of concentrated $H_3PO_4$ solution in 1:1 ratio was loaded on each device. Subsequently, the device washed with 5% methanol in an amount of 400 μL at least once. The analyte in the sample was eluted with an acetonitrile/methanol mixture (80/20) of 400 μL.

Experimental Conditions

| | |
|---|---|
| UPLC Column | 1.8 μm, 2.1 × 100 mm HSS T3 |
| Column Temperature | 30° C. |
| PDA Detection | 250-260 nm |
| Injection Volume | 2 μL |
| Run Time | 8 minutes |
| Sampling Rate | 20 (pts/sec) |
| Mobile Phase A1 and A2 | 10 mM pH 3 Ammonia Formate |
| Mobile Phase B1 and B2 | 100% ACN |
| Strong Needle Wash | ACN |
| Strong Needle Wash Volume | 500 μL |
| Weak Needle Wash Volume | 1000 μL 10% MeOH |
| Seal Wash | 20/80 ACN/H2O |
| Loop Type | 5 μL |
| Loop Option | Partial Loop with Needle Overfill |

Gradient Table

| Gradient Time (min) | Flow Rate (mL/min) | % A | % B | Curve |
|---|---|---|---|---|
| Initial | 0.42 | 99 | 1 | Initial |
| 7 | 0.42 | 1 | 99 | 6 |
| 8 | 0.42 | 99 | 1 | 6 |

Results (1) Eluate from each device format (n=6) was collected and analyzed as in Table 3. Each analyte was detected using 254 nm UV spectrometer and quantitated for % recovery calculations.

TABLE 3

[Analyte recovery and relative standard deviation.]

| Analyte | Device 1 | | Device 2 | | Device 3 | |
|---|---|---|---|---|---|---|
| (% recovery, n = 6) | AVG | % RSD | AVG | % RSD | AVG | % RSD |
| Caffeine | 116 | 1 | 108 | 1 | 99 | 11 |
| Naphthalene sulfonic acid | 101 | 2 | 93 | 4 | 82 | 7 |
| Salicylic acid | 114 | 1 | 104 | 2 | 99 | 7 |
| Propranolol | 118 | 1 | 106 | 1 | 98 | 9 |
| Ketoprofen | 117 | 1 | 106 | 2 | 98 | 9 |
| Naproxen | 113 | 2 | 105 | 3 | 97 | 10 |
| Niflumic acid | 116 | 0 | 102 | 2 | 95 | 8 |

From the results in Table 3, Devices 1, 2 and 3 show similar results in the recovery rate of each analyte. In particular, when Device 2 including OASIS® HLB and OSTRO® sorbents without a separating frit was used for extraction, most of the analytes have recovery rates between about 93 and 108%. In Device 3, analyte recovery % RSDs were substantially greater than those of Devices 1 and 2, and that may be caused with uneven flow rates due to the additional frit in between OASIS® HLB and OSTRO® sorbents. Most multisorbent SPE devices on the market today use a frit to separate the different sorbents.

(2) Eluate from each device was collected and analyzed as in Table 4. In particular, MS/MS was used for phospholipid removal percentiles by comparing to the untreated sample. The amount of phospholipids in samples and elutes may be obtained with sum at m/z 496, 520, 522, 524, 704, 758, and 804.

TABLE 4

[Data for phospholipid removal from eluate.]

| Device (Sorbent) | % removal of phospholipid | % RSD |
|---|---|---|
| 1 (OASIS ® HLB only) | 80.5 | 3 |
| 2 (OASIS ® HLB - OSTRO ®) | 98.2 | 1 |
| 3 (OASIS ® HLB - frit-OSTRO ®) | 96.0 | 2 |

Device 1 removed about 80% of phospholipids while Devices 2 and 3 removed over about 95% phospholipids. In addition, the % RSDs of Device 1 were substantially higher compared to Devices 2 and 3.

Overall, Device 2 may provide the optimum results for extraction and clean-up process prior to mass spectrometric analysis. Device 3, containing the invention sorbent combination in 1 cc cartridges that are separated by a frit, as commonly done with multisorbent devices, shows substantially higher relative standard deviations (RSD) compared to the other configurations.

Example 3

Method for Determining MS/MS Matrix Effects

One method for determining potential matrix effects utilizes post-column infusion of eluates derived from proposed SPE methods using blank (unspiked) plasma (see picture below). A clean standard (1), containing the analytes of interest, is injected on the column. A tee of the infused eluates combines with the fluid from the column outlet. The combined flow is then directed into the MS for analysis.

The MS detector analyzes each analyte, as it elutes from the column, in the presence of the blank plasma eluates from the various sample preparation methods to be compared. This method shows matrix effects differences attributed to matrix substances remaining in the eluate. The MS response for each of the analytes while infusing matrix-free elution solutions is compared to the MS response for each of the analytes while infusing eluates from processing blank plasma by the cited method. This approach to accessing matrix effects in known to those familiar with the art. Examples of a reference for this approach is C. Polson et al./*J. Chromatogr. B* 785 (2003) 263-275.

Each eluate obtained from the SPE or sample preparation method using each device is infused into the line (3) for MS analysis. In this case, rat plasma was used as the sample and was not spiked with analytes. Table 5 contains the description of the devices used to obtain the blank plasma eluates and the MS responses relative to the infusion of the elution solution.

As shown in Table 5, the device with 10 mg OASIS® HLB and 10 mg OSTRO® combination gave the lowest average matrix effects. Since the most likely contributors to matrix effects are salts, other polar components and PL, the larger ME seen in Table 5 for every sample prep technique other than the invention are possibly due to one or more of these matrix components.

Other matrix components not listed in Table 6 are reduced by SPE with the OASIS® HLB and the Inventive sorbent combination. The expected sources of matrix effects are summarized in Table 6 for each of the sample preparation methods. The average of the absolute value of the matrix effects are reported because both suppression and enhancement are viewed as equally detrimental to accurate quantitation.

TABLE 5

[Matrix effect data for blank plasma eluates prepared by various sample preparation protocols.]

| Infusion Solution of Blank Plasma Eluates Prepared as Stated | Procainamide | Desloratadine | Clozapine | Risperidone | 9-OH Resperidone | Average* Matrix Effects |
|---|---|---|---|---|---|---|
| Eluate of HLB + OSTRO ®Sorbents | −15 | −5 | −6 | −19 | 9 | 11 |
| Eluate of HLB Sorbents | −15 | 17 | −8 | 10 | 30 | 16 |
| Eluate of OSTRO ®PPT | −34 | −62 | −51 | −39 | −37 | 45 |
| Eluate of 3:1 PPT - no sorbent | −65 | −72 | −71 | −53 | −61 | 64 |

*average of the absolute value of the MEs

TABLE 6

Common causes of matrix effects in eluates

| Infusion Solution of Blank Plasma Eluates Prepared as Stated | Salt and other Polar Components Effects | Phospholipid Effect | Average* Matrix Effects |
|---|---|---|---|
| Eluate of HLB+ OSTRO ®Sorbents | − | − | 11 |
| Eluate of HLB Sorbents | − | ++ | 16 |
| Eluate of OSTRO ®PPT | +++ | − | 45 |
| Eluate of 3:1 PPT - no sorbent | +++ | +++ | 64 |

1 cc Cartridge SPE Procedure for eluates in the above table:
Condition with 400 μL MeOH
Equilibrium with 400 μL water
Load 400 μL of a 1:1 plasma: 4% $H_3PO_4$ sample
Wash with 400 L 5% MeOH
Elute with 400 L 80/20 MeCN/MeOH LC Conditions

| Column: | ACQUITY UPLC 1.7 μm BEH C18, 2.1 × 100 mm (pn 186002352) |
|---|---|
| Mobile phase A: | 10 mM pH 3 ammonium formate |
| Mobile phase B: | MeOH |
| Strong needle wash | MeOH |
| Weak needle wash | 10% MeOH |
| Seal Wash | 20:80 ACN:H2O |
| Loop Volume | 5 uL |
| Injection Mode | Partial Loop with Needle Overfill |
| Injection Volume: | 2 μL |

Solvent Gradient Table shown below:

Gradient Table

| Gradient Time (min) | Flow Rate (mL/min) | % A | % B | Curve |
|---|---|---|---|---|
| Initial | 0.42 | 99 | 1 | Initial |
| 7 | 0.42 | 1 | 99 | 6 |
| 8 | 0.42 | 99 | 1 | 6 |

MS Conditions

| MS | Waters Quatro Micro |
|---|---|
| Capillary voltage | 3 kV |
| Cone Voltage | 35 V |
| Desolvation Temp | 500° C. |
| Desolvation Gas | 100 L/hr |

| Analyte | Capillary (kV) | Cone voltage (V) | Collision (eV) | Precursor | Product |
|---|---|---|---|---|---|
| Clozapine | 3 | 30 | 25 | 327.02 | 270.1 |
| Desloratadine | 1.5 | 28 | 20 | 311.2 | 259.25 |
| Procainamide | 2 | 20 | 35 | 236.4 | 120.4 |
| Risperidone | 3 | 30 | 30 | 411.3 | 191.6 |
| 9-OH Risperidone | 2.5 | 35 | 30 | 427.2 | 207.25 |

Example 4

Removal of Phospholipids Using Layered and Mixed Sorbents

Each device was prepared with 1 cc cartridge that contained 1) a mixed sorbent containing about 20 mg of OASIS® HLB and about 40 of OSTRO®, 2) a mixed sorbent containing about 10 mg of OASIS® HLB and about 20 mg of OSTRO®, 3) a layered sorbents containing about 10 mg of OASIS® HLB as a top layer and about 20 mg of OSTRO® as a bottom layer. The device was condition with 80:20 acetonitrile/water.

Milk was extracted and precipitated with pH 5 Succinic/EDTA buffer. After centrifugation, the supernatant was collected and loaded on the conditioned devices. The devices were washed with 5% methanol/water. The pellet after the centrifugation was resuspended, extracted with 80:20 acetonitrile/water (0.2% formic acid) and centrifuged. After centrifugation, the supernatant was collected and loaded on the device to elute the devices.

Figure 4:
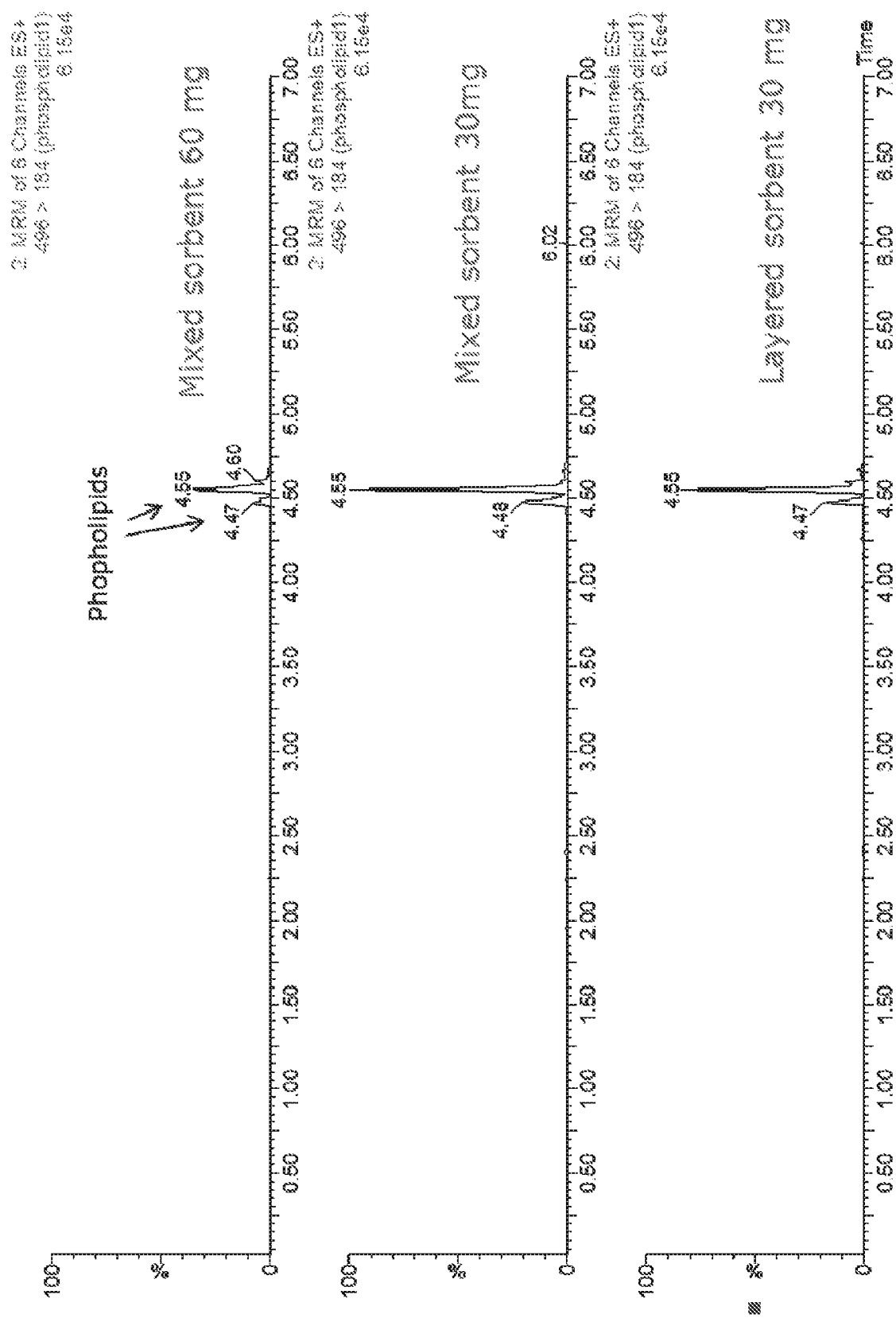
FIG. 4 shows exemplary mass spectrometric analyses of a milk sample in the region of phospholipids. The mass spectrometric analyses were obtained after extraction of the milk sample using devices including exemplary mixed sorbents containing OASIS® HLB sorbent and OSTRO® sorbent or an exemplary layered sorbent of OASIS® HLB sorbent and OSTRO® sorbent according to exemplary embodiments of the present invention.

FIG. 4 shows results of mass spectrometric analysis of the milk sample at the regions for phospholipids. When the mixed sorbent and layered sorbent are used in same amounts, phospholipid removal rate may be similar. When a greater amount of the sorbent is used, phospholipid removal rate may be increased.

Example 5

Detecting Veterinary Drugs in Milk

A device was prepared with 1 cc cartridge that contained a mixed sorbent of about 10 mg of OASIS® HLB and about 20 mg of OSTRO®. The device was condition with 80:20 acetonitrile/water.

Milk was extracted and precipitated with pH 5 Succinic/EDTA buffer. After centrifugation, the supernatant was collected and loaded on the conditioned device. The device was washed with 5% methanol/water. The pellet after the centrifugation was resuspended, extracted with 80:20 acetonitrile/water (0.2% formic acid) and centrifuged. After centrifugation, the supernatant was collected and loaded on the device to elute.

For comparative examples, each 1 cc cartridge containing about 100 mg of $C_{18}$ sorbent, about 30 mg of OASIS® HLB, and a combined sorbent of about 20 mg of Z-Sep (Sigma-Aldrich, USA) and about 50 mg of $C_{18}$ was used. Extraction and SPE was performed according to manufacturer's manual of each sorbent product.

Figure 5:
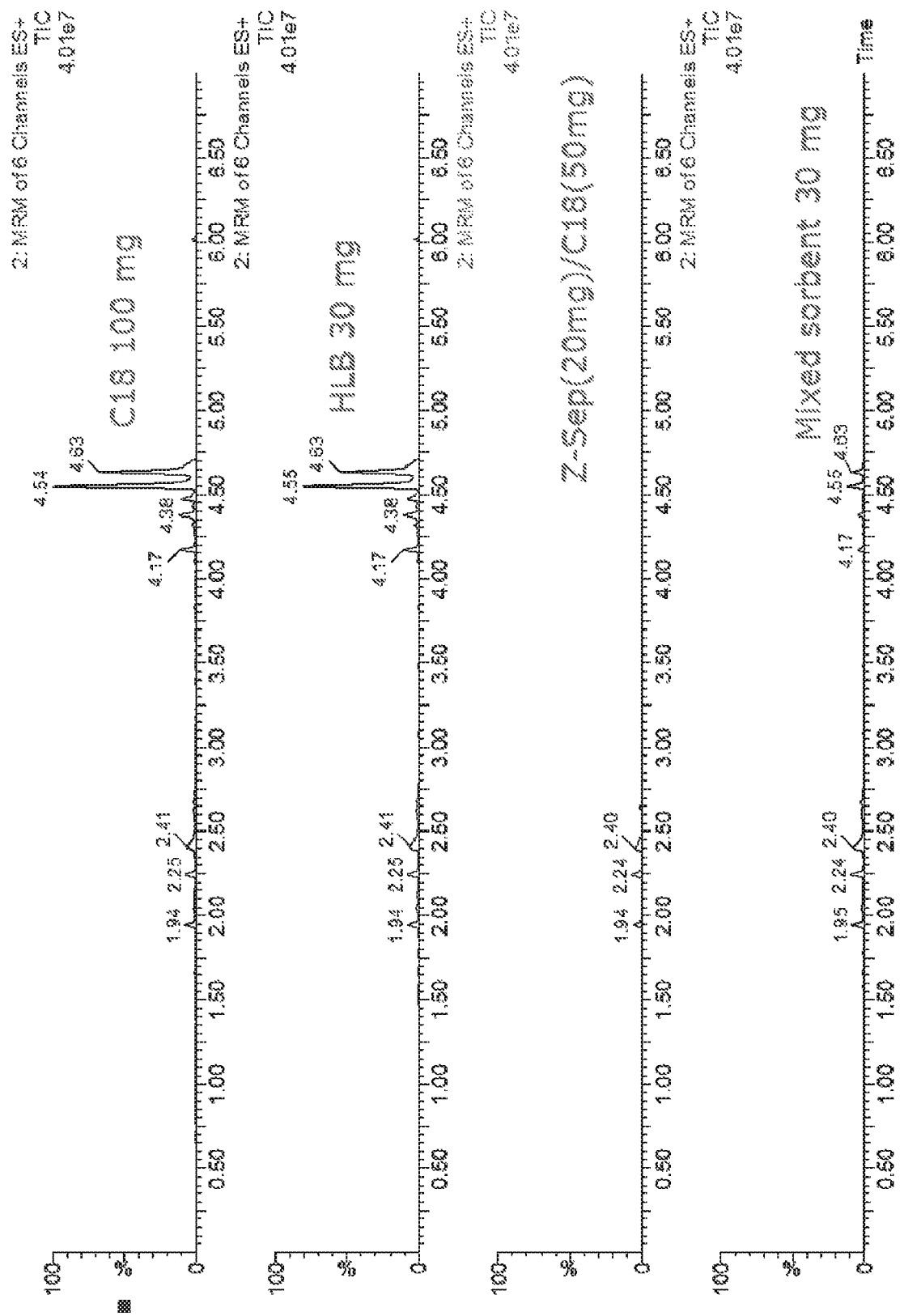
FIG. 5 shows an exemplary mass spectrometric analysis of a milk sample. The mass spectrometric analyses were obtained after extraction of the milk sample using devices including C18, OASIS® HLB sorbent, Z-Sep/C18, and a mixed sorbent containing OASIS® HLB sorbent and OSTRO® sorbent according to an exemplary embodiment of the present invention.
Figure 7:
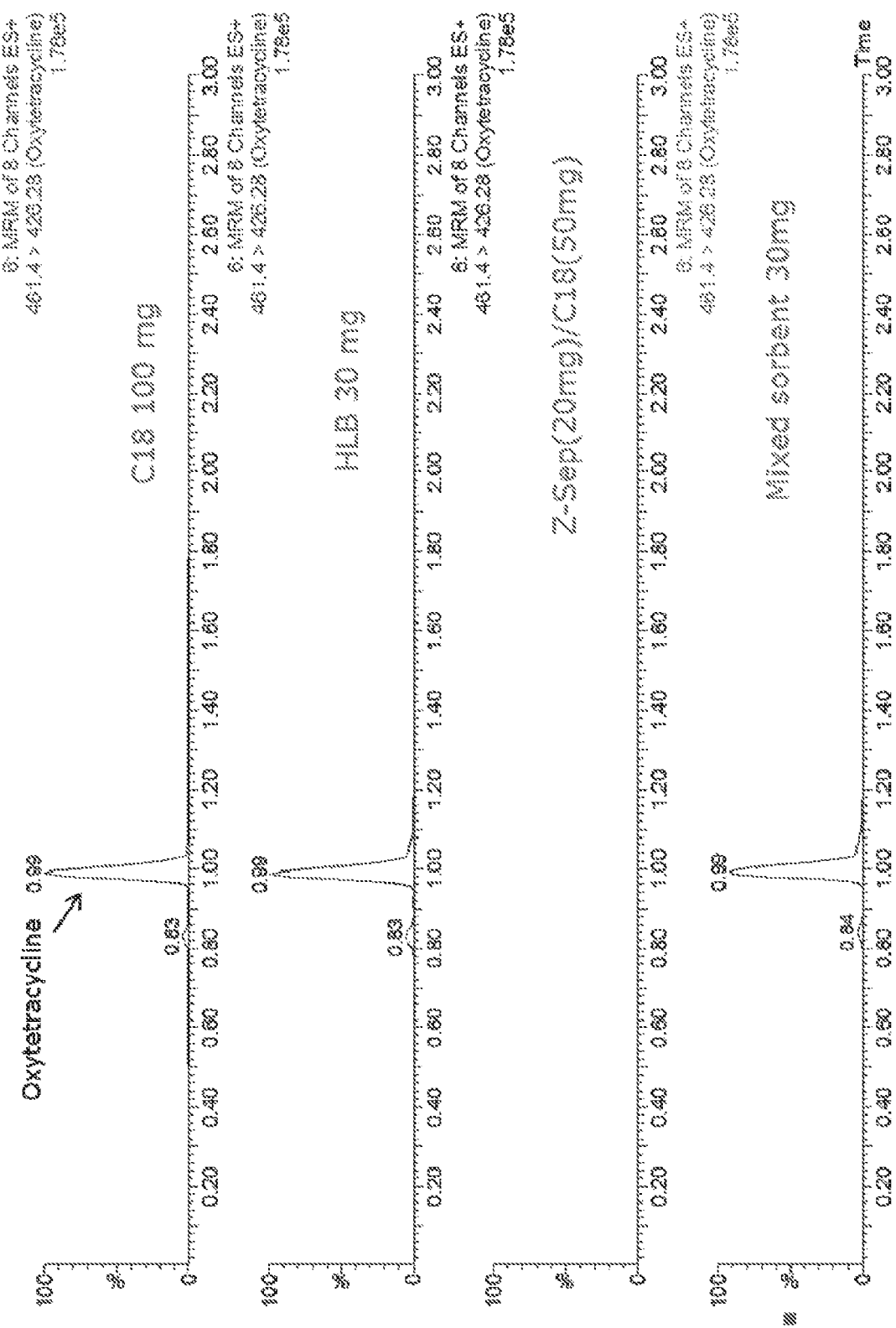
FIG. 7 shows an exemplary mass spectrometric analysis of a milk sample in the region of oxytetracycline. The mass spectrometric analyses were obtained after extraction of the milk sample using devices including $C_{18}$, OASIS® HLB sorbent, Z-Sep/$C_{18}$, and a mixed sorbent containing OASIS® HLB sorbent and OSTRO® sorbent according to an exemplary embodiment of the present invention.

In FIG. 5, results of phospholipid removal from milk sample by the device containing mixed sorbents of OASIS® HLB and OSTRO® according to an exemplary embodiment of the present invention of the present invention and other devices in comparative examples are shown. Further, in Table 7, the removal rates are shown from each device. Particularly, the device of the present invention removed phospholipids with substantially improved efficiency greater than about 90% compared to non-polar sorbent (e.g. $C_{18}$).

to an exemplary embodiment of the present invention, while Z-sep did not recover enrofloxacin from the sample. Similarly, as shown in FIG. 7, oxytetracycline was recovered and clearly analyzed by mass spectrometry after extraction using the device containing mixed sorbents of OASIS® HLB and OSTRO® according to an exemplary embodiment of the present invention, while Z-sep did not recover oxytetracycline from the milk sample. Comparing the average recoveries for each of the sorbent containing devices, the highest average recovery was achieved for device containing mixed sorbents of OASIS® HLB and OSTRO® according to an exemplary embodiment of the present invention. The average of the absolute values for ME shows that the Zsep device gave the lowest value of 28%. However, three of the veterinary drugs were not recovered at all. The MEs for the other three devices are essentially equivalent.

Example 6

Analysis of Steroids in Human Plasma

Corticosteroid analyses have been a challenge that require time consuming derivatization prior to GC-MS methods. Efforts have been made to transition away from GC-MS or immunoassays in preference of LC-MS (M. Ohno et al./*J. Chromatogr. B* 746 (2000) 95-101 and U. Ceglarek et al./*Clinica Chimica Acta* 401 (2009) 114-118). Below, the use of the inventive device and the provided SPE method greatly reduce the time required for the analysis cortisol, androstenedione, and 17α-hydroxyprogesterone. Corticosteroids were extracted from plasma using a µElution plate format

TABLE 7

| Compound | Device of Invention | | | Zsep | | | Sep-Pak C18 | | | HLB | | |
|---|---|---|---|---|---|---|---|---|---|---|---|---|
| | % REC | % RSD | % ME | % REC | % RSD | % ME | % REC | % RSD | % ME | % REC | % RSD | % ME |
| Carbadox | 60 | 3 | −13 | 90 | 13 | −5 | 48 | 4 | 22 | 51 | 13 | 3 |
| Ciprofloxacin | 99 | 4 | 47 | 0 | | | 107 | 4 | 44 | 94 | 13 | 51 |
| Chloramphenicol | 124 | 8 | −62 | 118 | 4 | −13 | 129 | 6 | −67 | 108 | 20 | −65 |
| Chlorotetracyline | 49 | 59 | −36 | 0 | | | 47 | 33 | 13 | 34 | 15 | −12 |
| Dexamethasone | 120 | 2 | 11 | 115 | 1 | 14 | 111 | 2 | 9 | 107 | 2 | 5 |
| Enrofloxacin | 108 | 14 | −10 | 0 | 26 | −17 | 109 | 10 | 1 | 102 | 13 | 7 |
| Erythromycin | 68 | 10 | −44 | 71 | 1 | 13 | 61 | 8 | −45 | 63 | 7 | −47 |
| Lincomycin | 111 | 3 | −90 | 88 | 13 | −87 | 101 | 5 | −95 | 96 | 9 | −95 |
| Oxacillin | 113 | 1 | 10 | 91 | 3 | 12 | 107 | 1 | 5 | 100 | 2 | 7 |
| Oxytetracycline | 67 | 8 | 66 | 0 | | | 59 | 3 | 95 | 63 | 14 | 104 |
| Penicillin | 111 | 2 | −20 | 76 | 6 | −12 | 103 | 6 | −16 | 101 | 6 | −10 |
| Phenylbutazone | 113 | 8 | −42 | 79 | 19 | −44 | 100 | 5 | −18 | 103 | 7 | −32 |
| Ractopamine | 109 | 3 | −30 | 103 | 5 | −32 | 101 | 6 | −22 | 99 | 6 | −19 |
| Salbutamol | 100 | 12 | −97 | 95 | 4 | −97 | 100 | 7 | −97 | 90 | 6 | −97 |
| Sulfamerazine | 79 | 5 | −3 | 69 | 4 | 13 | 80 | 3 | 7 | 85 | 6 | 5 |
| Sulfamethazine | 84 | 6 | −15 | 60 | 5 | 5 | 75 | 6 | 14 | 81 | 1 | 5 |
| Sulfanilamide | 72 | 12 | 25 | 62 | 6 | 25 | 77 | 5 | 17 | 77 | 14 | 21 |
| Tetracycline | 64 | 10 | * | 0 | | | 67 | 2 | * | 62 | 9 | * |
| Phospholipids | >90% removed | | | >99% removed | | | <10% removed | | | <10% removed | | |
| Average \|% ME\| | 37% | | | 28% | | | 35% | | | 34% | | |
| Average Recovery (REC) | 91.7% | | | 62.1% | | | 87.9% | | | 84.2% | | |

\* Susceptible to non-specific binding effects which produce loss in solvent only standard.

Figure 6:
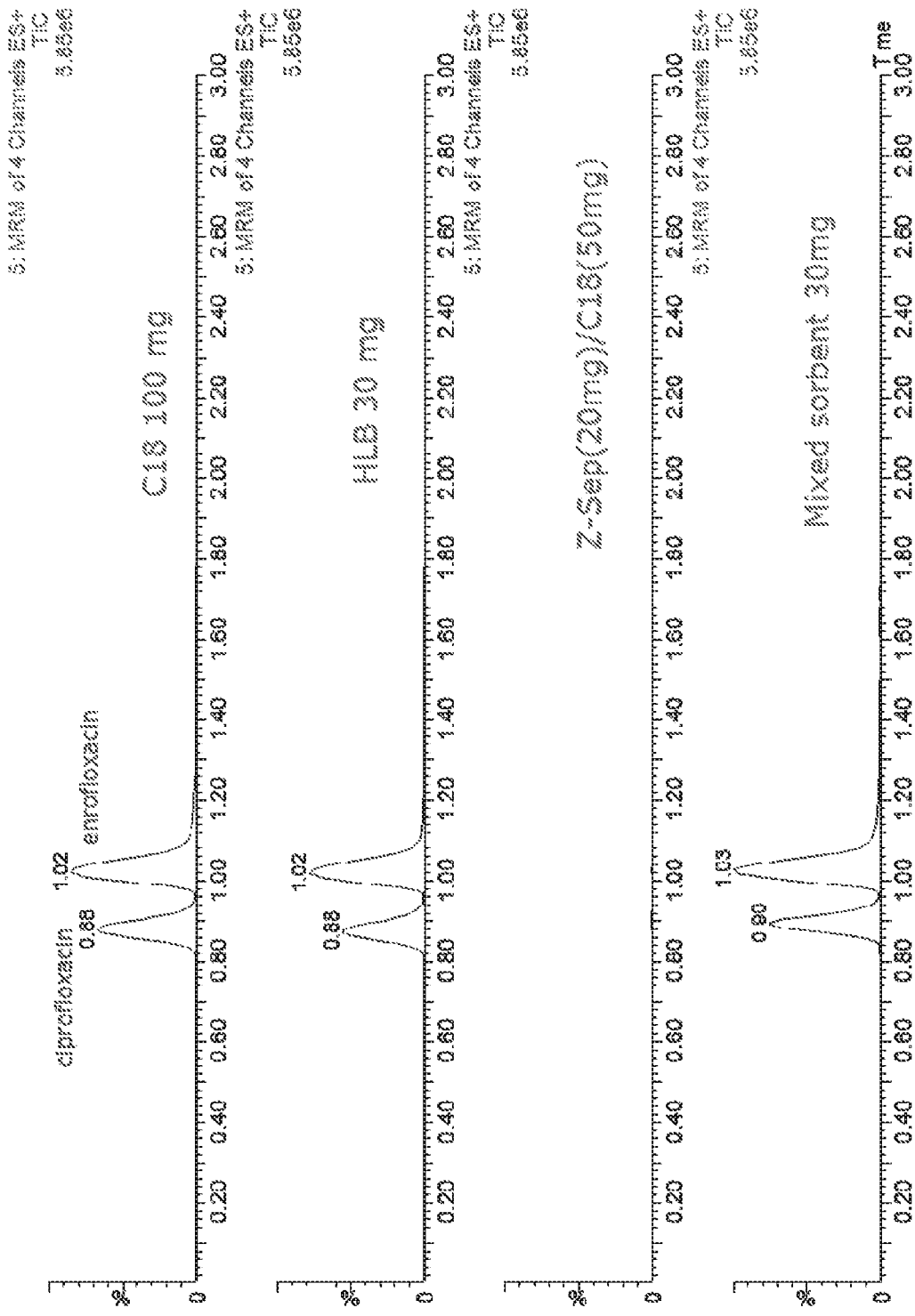
FIG. 6 shows an exemplary mass spectrometric analysis of a milk sample in the region of ciprofloxacin and enrofloxacin. The mass spectrometric analyses were obtained after extraction of the milk sample using devices including $C_{18}$, OASIS® HLB sorbent, Z-Sep/$C_{18}$, and a mixed sorbent containing OASIS® HLB sorbent and OSTRO® sorbent according to an exemplary embodiment of the present invention.

In FIGS. 6-7, veterinary drugs contained in milk were analyzed by mass spectrometry after extraction using the device according to an exemplary embodiment of the present invention and other devices as of comparative examples. As shown in FIG. 6, ciprofloxacin and enrofloxacin in the milk sample were recovered and clearly analyzed by mass spectrometry after extraction using the device containing mixed sorbents of OASIS® HLB and OSTRO® according which contained a mixed sorbent consisting of 2 mg OSTRO® and 1 mg OASIS® HLB.

Procedure

Solid phase extraction was performed according to the following procedure. 1 mg/mL stocks of cortisol, androstenedione (A-dione), and 17α-hydroxyprogesterone (17-OHP) were purchased from Cerilliant Corporation (Round Rock, Tex., USA). A solution containing 10 ng/mL of each analyte was prepared in double charcoal stripped human plasma (MSG 4000 from Golden West Biological supply). 150 μL of blank or pre-spiked plasma was precipitated using 300 μL of a solution consisting of a 4:1 ratio of methanol (MeOH) and a solution of 89 g/L of $ZnSO_4$. The samples were aspirated several times using a pipette and centrifuged at 3220 rcf for 10 minutes. The supernatant from each replicate (n=4) was then combined with 900 μL of an aqueous solution of 4% $H_3PO_4$. The entire sample was then loaded onto the μElution plate in 2 aliquots without any preconditioning or equilibration. Each well of the plate was then washed with 2×200 μL aliquots of 25:75 MeOH:$H_2O$. All wells were eluted with 2×25 μL aliquots of a solution comprised of 90:10 ACN:MeOH. Solvent samples for matrix effects calculations were prepared by passing 2 × 25 μL aliquots of 90:10 ACN:MeOH through wells that had been previously washed with 2×200 μL aliquots of 25:75 MeOH: $H_2O$.

Samples that had been pre-spiked with 10 ng/mL of the steroid mix were post-spiked with 50 μL of a solution comprised of 25:75 MeOH:$H_2O$. Blank plasma samples that had not been pre-spiked were post-spiked with 50 μL of a solution of 25:75 MeOH: $H_2O$ containing 30 ng/mL of each of the steroids listed above (equivalent to the mass loaded in each sample). Solvent samples for matrix effects were spiked with 50 μL aliquots of a solution of 25:75 MeOH: $H_2O$ containing 30 ng/mL of each of the steroids listed above.

Recovery was calculated according to the following equation:

$$Recovery = \left(\frac{\text{Pre-spiked sample response}}{\text{Post-spiked sample response}}\right) \times 100\%$$

Matrix Effects were calculated according to the following equation:

$$\text{Matrix Effects} = \left(\left(\frac{\text{Response (post-spiked extracted sample)}}{\text{Response (Solvent standard)}}\right) - 1\right) \times 100\%$$

Chromatographic Conditions

Separation was achieved on a Waters' ACQUITY I-Class system with a fixed loop autosampler. The details are listed in the table below.
LC System: Waters ACQUITY I-Class UPLC System
Column: ACQUITY UPLC HSS T3 column, 1.7 μm, 2.1×50 mm (p/n 1860035358)
Column Temp: 40° C.
Sample Temp: 10° C.
Mobile Phase A (MPA): Water with 0.1% formic acid
Mobile Phase B (MPB): ACN with 0.1% formic acid
Purge Solution: 25:25:50 ACN:MeOH:Water
Wash Solution: 10% ACN
Injection Volume: 7.5 μL
Mobile phase gradient for steroid application.

| Time (min.) | Flow (mL/min.) | % A | % B |
|---|---|---|---|
| 0 | 0.6 | 70 | 30 |
| 1.0 | 0.6 | 50 | 50 |
| 2.0 | 0.6 | 45 | 55 |
| 2.5 | 0.6 | 5 | 95 |
| 3.5 | 0.6 | 5 | 95 |
| 3.6 | 0.6 | 70 | 30 |
| 4.5 | 0.6 | 70 | 30 |

Mass Spectrometry Conditions

The samples were analyzed in a WATERS TQ-S mass spectrometer in MRM mode. The conditions are listed below.
MS System: Waters Xevo TQ-S Mass Spectrometer
Ionization mode: ESI Positive
Capillary Voltage: 1.0 kV
Cone voltage: Optimized for each analyte
Desolvation Gas: 1000 L/hr
Cone Gas: 150 L/hr
Desolvation Temp: 500° C.
Source Temp: 150° C.

Data were acquired and analyzed using MassLynx® Software (V4.1; SCN 876). Quantification was performed using TargetLynx®.

The following table lists the retention time and individualized MS parameters of the steroids including MRM transitions, cone voltage, and collision energy. Two MRM transitions were used for each compound, a primary (listed first) and a confirmatory transition (listed second).

| Analyte | RT (min) | MRM transitions (m/z) | Cone Voltage (V) | Collision Energy (eV) |
|---|---|---|---|---|
| Cortisol | 0.72 | 336.17 > 121.06 | 42 | 22 |
| | | 336.17 > 91.03 | 42 | 52 |
| Androstenedione | 1.50 | 287.17 > 97.08 | 58 | 20 |
| | | 287.17 > 109.04 | 58 | 26 |
| 17-OHP | 1.55 | 331.17 > 97.08 | 58 | 26 |
| | | 331.17 > 295.2 | 58 | 16 |

Several phospholipid transitions were also monitored to determine the degree of phospholipid removal. Their MRM transitions and MS parameters are listed in the table below. The same LC parameters used for the analysis of corticosteroids were used for the phospholipid analysis with the addition of an additional 3 minute hold at 95% B to fully elute the phospholipids.

| Precursor Ion (m/z) | Product Ion (m/z) | Cone Voltage (V) | Collison Energy (eV) | Phospholipid Class |
|---|---|---|---|---|
| 496.3 | 184.2 | 58 | 30 | Lyso-phosphatidylcholine 16:0 |
| 524.4 | 184.2 | 58 | 30 | Lyso-phosphatidylcholine 18:0 |
| 703.6 | 184.2 | 58 | 30 | Sphingomyeline 34:1 |
| 758.40 | 184.40 | 58 | 30 | Phosphatidylcholine 34:2 |
| 786.40 | 184.40 | 35 | 30 | Phosphatidylcholine 36:2 |
| 806.40 | 184.40 | 58 | 30 | Phosphatidylcholine |

Results

Extraction recovery and matrix effects are listed in The following Table. Recovery averaged 72.2% across all three compounds and matrix effects averaged −10.1%.

TABLE 8

Summary of corticosteroid recoveries, standard deviations, and matrix effects.

| | Recovery | | | Matrix Effects | |
|---|---|---|---|---|---|
| | Mean | S.D | % RSD | Mean | S.D. |
| Cortisol | 72.7% | 3.1% | 4.2% | −19.0% | 3.1% |
| Adione | 72.5% | 1.9% | 2.7% | −6.9% | 2.2% |
| 17-OHP | 71.5% | 1.9% | 2.6% | −4.5% | 1.3% |
| Mean | 72.2% | | Mean | −10.1% | |

Phospholipid (PL) removal was compared to samples that had been subject to the same protein precipitation procedure as the extracted samples but had not been subject to solid phase extraction. The summed peak areas of all monitored phospholipids are listed below and reveal a removal of 97% of the phospholipids present in plasma samples. Given the fact that the extracted samples are 6x more concentrated than the precipitated samples, the actual phospholipid removal is closer to 99.5%.

TABLE 9

Comparison of summed peak areas for phospholipids.

| | Summed PL Peak area | Relative Abundance |
|---|---|---|
| Protein precipitation only | 22152370 | 100% |
| µElution extract | 690579 | 3.12% |

Example 7

Extraction of a Diverse Set of Analytes from 1 cc Devices of Invention

Devices were prepared with 1 cc cartridges each that containing 30 mg the following mixture of sorbents: about 10 mg of OASIS® HLB and about 20 mg of OSTRO®. The following 3 step protocol was followed:
1. Load 1 mL plasma (1:1 dilute with 4% $H_3PO_4$)
2. Wash with 1 mL 5% MeOH
3. Elute with 1 mL 90/10 MeCN/MeOH (v/v)

LC-MS/MS analysis was performed using the chromatographic and MS conditions stated below. Analyte recoveries were ≥91% with relative standard deviations between 4 and 10%. These recoveries were achieved for a wide range of ionic analytes having log P values of 0.05-4.9 and pKa-values of 2.2-9.7, and the neutral analyte betamethasone. Matrix effects (ME) of less than ±20% are considered acceptable for targeted quantitative analysis of drugs. The ME values in the table below are well within this acceptance criteria and the average analyte recovery is 98.8% with % RSDs of ≤10% on the inventive device.

TABLE 10

SPE results for extracted plasma using a 3 step SPE protocol.

| n = 4 | % Recovery | Standard Deviation | Matrix Effect | Standard Deviation |
|---|---|---|---|---|
| AZT | 97 | 4 | 0.96 | 0.9 |
| Propra | 103 | 6 | 1.46 | 7 |
| 7HC | 90 | 4 | 1.56 | 7.9 |
| Phen | 100 | 10 | 2.19 | 6.9 |
| Protrip | 103 | 5 | 0.83 | 2.8 |
| Amitrip | 104 | 6 | −4.03 | 3.4 |
| BetaMeth | 103 | 5 | 2.92 | 1.8 |
| Alpraz | 91 | 4 | −0.5 | 1.1 |
| Naprox | 98 | 7 | −1.64 | 2 |

Example 8

Analysis of Synthetic Cannabinoids in Whole Blood

This example uses whole blood which is often used in forensic toxicology cases. Whole blood samples contain a higher concentration of phospholipids due the increased amounts released from lysed blood cells. Matrix effects are increased in whole blood samples for the same reason.

Experimental
LC Conditions:
LC System: ACQUITY UPLC I-Class
Column: CORTECS UPLC $C_{18}$, 1.6 µm; 2.1×100 mm P/N 186007095
Column Temp.: 30° C.
Injection Volume: 5 µL
Flow Rate: 0.6 mL/min.
Mobile Phase A: 0.1% formic acid in MilliQ water
Mobile Phase B: 0.1% formic acid in ACN
Gradient: Initial conditions started at 30% B. The % B was increased to 50% over 2 minutes, and held at 50% B for 1 minute, increased to 90% B over 4 minutes and then returned to 30% over 0.2 minutes. The system was allowed to re-equilibrate for 1.3 min. The entire cycle time was 8.5 min.
MS Conditions:
MS System: XEVO® TQD Mass spectrometer
Ionization Mode: ESI Positive
Acquisition Mode: MRM (See Table 2 for transitions)
Capillary Voltage: 1 kV
Synthetic Cannabinoid Standards:
AM2233, JWH-015, RCS-4, JWH-203, RCS-8, JWH-210, JWH-073, and JWH-018 were purchased from Ceriliant (Round Rock, Tex.). All other compounds and metabolites were purchased from Cayman Chemical (Ann Arbor, Mich.).

Individual stocks (1 mg/mL) were prepared in methanol, DMSO, or 50:50 DMSO:methanol. A combined stock solution of all compounds (10 µg/mL) was prepared in methanol. Working solutions were prepared daily in 40% methanol. Calibrators and quality control (QC) samples were prepared by spiking working standards at various concentrations and into matrix (whole blood). Calibrator concentrations ranged from 0.2-100 ng/mL for all analytes. Quality control samples were prepared at 2.5, 7.5, and 75 ng/mL, in rat whole blood.

The 22 compounds analyzed are listed in Table 10 and constitute a panel that includes various classes of forensically relevant synthetic cannabinoids. These include adamantoylindoles (AM 1248 and AKB48), napthoylindoles (JWH 022), phenylacetyl indoles (RCS-4 and RCS-8), and tetramethylcyclopropylindoles (UR-144 and XLR11).

Major metabolites of JWH-073 and JWH-018 were also included, as some of these compounds are structural isomers with identical mass spectral fragments that require adequate chromatographic separation for accurate quantitation.

The following table lists the retention time and individualized MS parameters of the steroids including MRM transitions, cone voltage, and collision energy. Two MRM transitions were used for each compound, a primary (listed first) and a confirmatory transition (listed second).

$$\% \text{ Recovery} = \left(\frac{\text{Area } A}{\text{Area } B}\right) \times 100\%$$

TABLE 11

Retention Times and MS parameters for synthetic cannabinoids

| No. | Cannabinoids Compound | Retention Time (min) | Mol. Formula | Cone Voltage (V) | 1st and 2nd MRM Transitions | Collision Energy (eV) |
|---|---|---|---|---|---|---|
| 1 | AM2233 | 0.97 | $C_{22}H_{23}IN_2O$ | 48 | 459.2→98.05 | 50 |
|  |  |  |  | 48 | 459.2→112.1 | 40 |
| 2 | RCS-4, M10 | 1.34 | $C_{20}H_{21}NO_3$ | 40 | 324.2→121.0 | 36 |
|  |  |  |  | 40 | 324.2→93.0 | 72 |
| 3 | RCS-4, M11 | 1.57 | $C_{20}H_{19}NO_3$ | 42 | 322.2→121.0 | 32 |
|  |  |  |  | 42 | 322.2→93.0 | 60 |
| 4 | AM 1248 | 1.78 | $C_{26}H_{34}N_2O$ | 62 | 391.4→135.1 | 42 |
|  |  |  |  | 62 | 391.4→112.1 | 50 |
| 5 | JWH-073 4-butanoic acid met. | 2.47 | $C_{23}H_{19}NO_3$ | 52 | 358.2→155.1 | 32 |
|  |  |  |  | 52 | 358.2→127.1 | 70 |
| 6 | JWH-073 4-hydroxybutyl met. | 2.51 | $C_{23}H_{21}NO_2$ | 52 | 344.2→155.1 | 32 |
|  |  |  |  | 52 | 344.2→127.1 | 70 |
| 7 | JWH-018 5-pentanoic acid met. | 2.71 | $C_{24}H_{21}NO_3$ | 54 | 372.2→155.1 | 32 |
|  |  |  |  | 54 | 372.2→127.1 | 72 |
| 8 | JWH-073 (+/−) 3-hydroxybutyl met. | 2.74 | $C_{23}H_{21}NO_2$ | 54 | 344.2→155.1 | 36 |
|  |  |  |  | 54 | 344.2→127.1 | 64 |
| 9 | JWH-018 5-hydroxypentyl met. | 2.84 | $C_{24}H_{23}NO_2$ | 50 | 358.2→155.1 | 24 |
|  |  |  |  | 50 | 358.2→127.1 | 48 |
| 10 | JWH-018 (+/−) 4-hydroxypentyl met. | 2.89 | $C_{24}H_{23}NO_2$ | 50 | 358.2→155.1 | 34 |
|  |  |  |  | 50 | 358.2→127.1 | 64 |
| 11 | JWH-015 | 4.97 | $C_{23}H_{21}NO$ | 48 | 328.2→155.1 | 32 |
|  |  |  |  | 48 | 328.2→127.1 | 62 |
| 12 | RCS-4 | 4.98 | $C_{21}H_{23}NO_2$ | 48 | 322.2→135.1 | 40 |
|  |  |  |  | 48 | 322.2→92.0 | 68 |
| 14 | JWH-022 | 5.34 | $C_{24}H_{21}NO$ | 52 | 340.2→155.1 | 34 |
|  |  |  |  | 52 | 340.2→127.1 | 60 |
| 13 | JWH-073 | 5.34 | $C_{23}H_{21}NO$ | 48 | 328.2→155.1 | 36 |
|  |  |  |  | 48 | 328.2→127.1 | 56 |
| 15 | XLR-11 | 5.44 | $C_{21}H_{28}FNO$ | 52 | 330.3→125.1 | 34 |
|  |  |  |  | 52 | 330.3→83.0 | 42 |
| 16 | JWH-203 | 5.59 | $C_{21}H_{22}ClNO$ | 44 | 340.2→188.1 | 32 |
|  |  |  |  | 44 | 340.2→125.0 | 42 |
| 17 | JWH-018 | 5.82 | $C_{24}H_{23}NO$ | 50 | 342.2→155.1 | 34 |
|  |  |  |  | 50 | 342.2→127.1 | 60 |
| 18 | RCS-8 | 6.23 | $C_{25}H_{29}NO_2$ | 44 | 376.3→121.1 | 36 |
|  |  |  |  | 44 | 376.3→91.0 | 66 |
| 19 | UR-144 | 6.36 | $C_{21}H_{29}NO$ | 48 | 312.3→214.2 | 35 |
|  |  |  |  | 48 | 312.3→125.1 | 34 |
| 20 | JWH-210 | 6.54 | $C_{26}H_{27}NO$ | 54 | 370.2→214.2 | 34 |
|  |  |  |  | 54 | 370.2→183.1 | 36 |
| 21 | AB 001 | 6.88 | $C_{24}H_{31}NO$ | 62 | 350.3→135.1 | 44 |
|  |  |  |  | 62 | 350.3→93.0 | 62 |
| 22 | AKB 48 | 7.05 | $C_{23}H_{31}N_3O$ | 36 | 366.3→135.1 | 28 |
|  |  |  |  | 36 | 366.3→93.1 | 68 |

Sample Preparation:

Samples were extracted using the sorbent combination of about 10 mg OASIS® HLB and about 20 mg OSTRO® for a total of 30 mg/well in a 96-well plates. 0.1 mL of a solution of 0.1 M zinc sulfate/ammonium acetate was added to 0.1 mL rat whole blood and vortexed for 5 seconds to lyse the cells. All samples were then precipitated by adding 400 µL ACN. The entire sample was vortexed for 10 seconds and centrifuged for 5 min at 7000 rcf. The supernatant was then diluted with 1.2 mL water prior to loading. The sample was directly loaded on 30 mg of the sorbent mixture without conditioning or equilibration. All wells were then washed with 2×500 µL 25:75 MeOH:water, and eluted with 2×500 µL 90/10 ACN/MeOH (v/v). The eluate was then evaporated under Nitrogen and reconstituted with 100 µL 30% ACN. 5 µL was injected onto the UPLC system.

Analyte recovery was calculated according to the following equation:

Where A equals the peak area of an extracted sample and B equals the peak area of an extracted matrix sample in which the compounds were added post-extraction.

Results

This extraction protocol results in nearly complete recovery for all compounds and minimizes matrix effects for the majority of analytes. All but one compound had recoveries of 80% or greater with an overall average recovery of 91%. Recoveries were consistent with an average % RSD at 5% across all compounds. Matrix effects across the panel were excellent. Only two compounds had matrix effects that exceeded 40%, and all remaining compounds had matrix effects less than 25%. The average magnitude of matrix effects was only 17%.

TABLE 12

Extraction protocol results

| Analyte | Recovery Mean | Recovery S.D. | Matrix Effects Mean | Matrix Effects S.D. | Abs ME |
|---|---|---|---|---|---|
| AM2233 | 86 | 4 | 6.7 | 10 | 6.7 |
| RCS4, M10 | 93 | 2 | 13.4 | 9 | 13.4 |
| RCS 4, M11 | 92 | 2 | 8.9 | 6 | 8.9 |
| AM 1248 | 77 | 9 | −40.6 | 4 | 40.6 |
| JWH-073, 4-COOH | 82 | 3 | 15.7 | 12 | 15.7 |
| JWH-073, 4-OH | 94 | 2 | 18.7 | 11 | 18.7 |
| JWH-018, 5COOH | 85 | 3 | 21.6 | 13 | 21.6 |
| JWH-073, 3-OH | 93 | 2 | 19.9 | 11 | 19.9 |
| JWH-018, 5-OH | 89 | 2 | 23.6 | 13 | 23.6 |
| JWH-018, 4-OH MET | 95 | 2 | 20.9 | 11 | 20.9 |
| JWH-015 | 92 | 5 | 9 | 8 | 9 |
| RCS-4 | 93 | 4 | 13.7 | 9 | 13.7 |
| JWH-022 | 94 | 7 | 10.9 | 8 | 10.9 |
| JWH-073 | 92 | 6 | 3.2 | 6 | 3.2 |
| XLR-11 | 95 | 4 | 10.5 | 7 | 10.5 |
| JWH-203 | 92 | 6 | −1.1 | 6 | 1.1 |
| JWH 018 | 92 | 8 | −11.9 | 7 | 11.9 |
| RSC-8 | 96 | 8 | −17.7 | 7 | 17.7 |
| UR-144 | 95 | 6 | −18.3 | 6 | 18.3 |
| JWH-210 | 92 | 11 | −21.8 | 13 | 21.8 |
| AB-001 | 91 | 9 | −25.7 | 13 | 25.7 |
| AKB-48 | 89 | 8 | −42.9 | 7 | 42.9 |
| Mean | 91 | 5 | | | 17.1 |

The protein precipitation (PPT) sample was analyzed for PLs before the 1.2 mL dilution. However, even without the dilution the supernatant represents 6× lower phospholipids concentration relative to the eluates (PPT volume=600 μL, eluate volume=100 μL). Compared with the protein precipitation (PPT) supernatant, the plate of this invention removes over 95% phospholipids in the whole blood sample resulting in a much cleaner extraction.

TABLE 13

Comparison with PPT

| | Sum of PL area |
|---|---|
| Elute with 90/10 ACN/MEOH | 1443 |
| PPT - 600 μL supernatant | 4617806 |

Example 9

Comparison of Phospholipids in Final Extracted Sample for 10-15 mg 96 Well Plates 96-well plates are used to increase the throughput of SPE methods. As such LC analyses of samples prepared using 96-well plates suffer from the effects of PLs that continue to accumulate on the analytical column presenting a constantly changing background of various phospholipids carried over from previously analyzed samples. To prevent this accumulate on phospholipids various solvent combinations at the end of the analytical gradient can be used as described by Little et al. (J. L. Little et al./*J. Chromatogr. B* 833 (2006) 219-230). Unfortunately, taking the time to "wash" off the phospholipids from the column requires time which is antithetical to the goals of fast high throughput analyses. In practice stable isotope labeled analogs or the analyte of interest is able to correct for most matrix effects but issues with this approach have been reported (E. Stokvis, H. Rosing, J. H. Beijnen, *Rapid Commun. Mass Spectrom.* 19 (2005) 401-407, and S. Wang et al./*Journal of Pharmaceutical and Biomedical Analysis* 43 (2007)701-707).

A 15 mg 96-well plate of the invention is compared to various state-of-the art polymer sorbents that appear to be marketed directly or indirectly against OASIS® SPE products. The table below contains a description of the commercially available sorbents in this comparison. Included are part numbers (PN) for the product used in the evaluation, PN for brochures that are provided by the manufacture of the products, and a brief sorbent description. These are provided such that the relevancy of the comparisons can be appreciated.

TABLE 14

Sorbents Utilized

| Sorbent | Manufacturer | 96-well plate | Plate PN | Brochure PN | Sorbent Description |
|---|---|---|---|---|---|
| BOND ELUTE PLEXA | Agilent | 10 mg, 2 mL<br>10 mg, 1 mL | A3969010<br>A4969010 | 5990-7567EN | A unique polymeric architecture with a non-retentive, hydroxylated, amide-free surface and a non-polar PS/DVB core |
| SOLA ™ HRP | Thermo Scientific | 10 mg/2 mL | 60309-001 | TG20993-EN0714S<br>BR20834_E01/14S | A frit-less Polystyrene DVB particles functionalised with vinyl prolidone. A Hydrophobic Reversed Phase (HRP) sorbent |
| STRATA ™-X 33 μm | Phenomenex | 10 mg | 8E-S100-AGB | BR75930712_W | A polymer sorbent having 3 retention mechanisms: PI-PI bonding with |

TABLE 14-continued

Sorbents Utilized

| Sorbent | Manufacturer | 96-well plate | Plate PN | Brochure PN | Sorbent Description |
|---|---|---|---|---|---|
| OASIS ® HLB 30 μm | Waters | 10 mg | 186000128 | 715000109 | phenyl ring; hydrogen bonding and dipole-dipole interactions with polar group; hydrophobic interactions with backbone of polymer A Hydrophilic-Lipophilic-Balanced, water-wettable, reversed-phase sorbent |

The concentration of the total phospholipids is compared across the above state-of-the art polymer sorbents. Each well in the 96-well plate of the invention contained a combination of 5 mg of OASIS® HLB and 10 mg of OSTRO® sorbents.

SPE Protocol

Each well in the 96-well plate was conditioned with 500 μL of methanol followed by equilibration with 500 μL of water. 500 μL of blank rat plasma was diluted 1:1 with 4% H3PO4 was loaded and washed with 500 μL of 5% methanol in water. Each well was then eluted with 500 μL of 100% acetonitrile and the following MRM phospholipid transitions were quantitated: 496.4→184.3, 520.4→184.3, 522.4→184.3, 524.4→184.3, 704.4→184.3, 758.4→184.3 and 806.4→184.3.

Results

As shown in Table 15 the eluates from the four tested commercially available polymer sorbents contain from 11 to 26 times higher phospholipids than the invention. Although the total mass of the plate of the invention was 15 mg compared to the 10 mg for all other plates, this difference would be expected to produce high phospholipid amounts in the its eluates.

Example 10

Recovery, % RSD, Matrix Effects, and Phospholipid Comparison of μElution Plate Containing Sorbent Mixture of Invention to HLB and Supported Liquid Extraction (SLE)

The following example demonstrates the performance benefits of the μElution plate containing the inventive sorbent combination compared to 2 mg OASIS® HLB μElution plate and ISOLUTE SLE+ 96-well plate (pn 820-0200-P01) from Biotage. The inventive sorbent combination was a mixture of 1 mg of HLB and 2 mg of OSTRO® in each well.

Procedures

The ISOLUTE SLE+ plate protocol used is as recommended by the manufacturer. Each well (n=8) was loaded with 200 μL of 1:1 rat plasma: water. Flow of the load solution was initiated by applying ~0.2 bar vacuum for 2-5 sec until the load samples gravity fed into the diatomaceous earth. The samples were then allowed to sit for 5 min to completely absorb and form a layer for extraction. The samples were eluted using 1 mL of 95:5 dichloromethane

TABLE 15

| Sorbent | Peak Area for each Phospholipid (m/z) → 184.3 | | | | | | | PL Summed | Summed PL Ratio to Invention |
|---|---|---|---|---|---|---|---|---|---|
|  | 496.4 | 520.4 | 522.4 | 524.4 | 704.4 | 758.4 | 806.4 |  |  |
| Plexa | 732,605 | 257,693 | 158,670 | 625,869 | 715 | 330,901 | 26,536 | 2,132,988 | 11 |
| Strata X | 962,802 | 393,961 | 238,518 | 1,121,175 | 1,043 | 160,272 | 23,109 | 2,900,881 | 15 |
| SOLA | 1,497,939 | 553,215 | 377,276 | 1,836,029 | 827 | 667,942 | 111,208 | 5,044,435 | 26 |
| HLB | 831,928 | 409,910 | 195,443 | 565,737 | 1,547 | 241,854 | 33,672 | 2,280,092 | 12 |
| Invention | 51,893 | 22,882 | 13,739 | 62,680 | 68 | 40,307 | 3,192 | 194,761 | 1 |

As such, devices according to various exemplary embodiments of the present invention may substantially improve phospholipid removal rate and further improve recovery rates of analytes of interest for mass spectrometric analysis. Accordingly, when analytes in samples such as food samples and biological samples are extracted by the devices or methods of the present invention as described herein, matrix effects are reduced or eliminated and no additional clean-up process is required before mass-spectrometric analysis.

(DCM):isopropanol (IPA) v/v. This solution was allowed to gravity feed through the plate for 5 min then a vacuum of ~0.2 bar was applied for 10-30 sec to complete the elution. Sample eluates were evaporated to dryness and reconstituted in 200 μL of 40% acetonitrile in water. The evaporated and reconstituted steps were required prior to analysis by reversed-phase LC-MS/MS due to the use of the water immiscible solvent. Four of the wells were loaded with spiked plasma and 4 with blank plasma. These were used to calculate recoveries and RSDs. Four solvent blanks were prepared to calculate matrix effects. Phospholipids were calculated from the spiked and unspiked plasma wells (total n=8).

For the μElution plates, each well (n=8) was loaded with 200 μL of 1:1 rat plasma: 4% H3PO4 sample. Each well was washed with 200 μL of 5% methanol in water and then eluted with 200 μL of 90/10 acetonitrile/methanol (v/v). Four of wells/plate were loaded with spiked plasma and 4 with blank plasma. These were used to calculate recoveries and RSDs. Four solvent blanks were prepared to calculate matrix effects. Phospholipids were calculated from the spiked and unspiked plasma wells (total n=8).

The values for the phospholipids are the signal area for the following MRM phospholipid transitions: 496.4→184.3, 520.4→184.3, 522.4→184.3, 524.4→184.3, 704.4→184.3, 758.4→184.3 and 806.4→184.3.

Results

A comparison of the recoveries, % RSDs, matrix effects and phospholipids found for the final extracts is shown in the table below. Similar recoveries were obtained for the 3 different plates except for naproxen (an acid) which cannot be effectively recovered with basic and neutral analytes by SLE. The lowest relative standard deviations were obtained on the plate of this invention. The average of the absolute value of ME for each analyte is about the same for the HLB and Invention plate, 2.3 and 1.9 respectively. The average ME for all analytes was about 8-9 times higher for the SLE+ plate at 18%. The μElution plate containing OASIS® HLB and ISOLUTE SLE+ plate shows 14 and 9 times higher summed PL than the plate of this invention.

Example 11

Performance Comparison for Different Sorbent Combination of Invention

In EXAMPLE 4 it was shown that the mixed sorbent combination and the layered version of OASIS® HLB and OSTRO® gave essentially the same performance. However, what might not be obvious are the results of this example.

Procedure

The μElution Plate was used as the SPE device in these experiments. Three plates were prepared with three sorbent combinations. Plate A was prepared with a 3 mg mixture of OASIS® HLB and OSTRO®. Plate B was prepared with 2 mg of OSTRO® on the bottom, topped with 1 mg of OASIS® HLB. Plate C was prepared with 1 mg of OASIS® HLB on the bottom and 2 mg of OSTRO® on the top. The plates were tested by loading 500 μL of 1:1 diluted plasma: 4% H3PO4 in water, washing with 500 μL of 5% methanol in water and then eluting with 2×50 μL of 90/10 acetonitrile/methanol (v/v) solution. The eluates were analyzed using the methods included in the experimental section except where otherwise indicated.

Results

The Table below shows a summary for the summed phospholipids for plates A, B, and C. The summed values for the phospholipids are the summed signal area for the following MRM phospholipid transitions: 496.4→184.3, 520.4→184.3, 522.4→184.3, 524.4→484.3, 704.4→184.3, 758.4→184.3 and 806.4→184.3. As can be seen from the table the mixed sorbent eluates and those for Plate B, with HLB on top, gave equivalently low values for the summed PL. Eluates from Plate C, with OSTRO® on top, gave substantially higher values for the summed PL.

TABLE 16

Comparison of the recoveries, % RSDs, matrix effects, and phospholipids for SPE with OSTRO ®HLB, and the Inventive Sorbent plates and the ISOLUTE SLE+ plate

|  | AZT | Propra | 7HC | Phen | Protrip | Amitrip | Beta Meth | Alpraz | Naprox |
|---|---|---|---|---|---|---|---|---|---|
| % Recovery n = 4 | | | | | | | | | |
| HLB | 95 | 93 | 95 | 98 | 96 | 96 | 92 | 94 | 92 |
| Invention | 86 | 104 | 104 | 104 | 103 | 105 | 103 | 94 | 101 |
| SLE+ | 119 | 96 | 109 | 104 | 103 | 99 | 114 | 107 | 20 |
| % RSD n = 4 | | | | | | | | | |
| HLB | 4 | 6 | 4 | 4 | 5 | 5 | 7 | 4 | 4 |
| Invention | 4 | 3 | 3 | 2 | 2 | 3 | 4 | 3 | 1 |
| SLE+ | 12 | 8 | 3 | 13 | 10 | 9 | 2 | 7 | 13 |
| Matrix Effects, n = 4 | | | | | | | | | |
| HLB | −0.6 | 3.1 | −1.2 | 4.2 | 2.8 | 1.8 | −2.3 | 4.6 | −0.1 |
| Invention | −0.2 | 2.5 | 3.5 | 3.7 | 1.2 | 2.4 | −0.4 | 2.1 | 0.8 |
| SLE+ | −22.7 | −21.5 | −9.4 | 10.9 | −29.7 | −31.1 | −13.5 | 15.1 | −7.5 |

| Phospholipids n = 8 | 496 | 520 | 522 | 524 | 704 | 758 | 806 | SUM | Ratio |
|---|---|---|---|---|---|---|---|---|---|
| HLB | 14,424,924 | 10,514,702 | 8,069,277 | 41,391,853 | 35,791 | 1,560,540 | 25,645 | 76,022,731 | 14 |
| Invention | 1,470,211 | 519,663 | 393,252 | 2,593,118 | 6,436 | 553,238 | 16,277 | 5,552,195 | reference |
| SLE+ | 7,196,019 | 4,628,717 | 4,411,160 | 24,969,565 | 86,342 | 4,576,433 | 63,884 | 47,652,211 | 9 |

TABLE 17

Summary of the summed phospholipids for the three different sorbent combinations in 96-well µElution plates

| Plate n = 4 | Sorbent | Summed PL |
|---|---|---|
| A | 3 mg Mixed HLB/OSTRO® | 2,571,966 |
| B | 1 mg HLB on top/2 mg OSTRO® on bottom | 2,577,732 |
| C | 2 mg OSTRO® on top/1 mg HLB on bottom | 11,690,090 |

Unlike the phospholipids, the recoveries and standard deviation are not affected by the differences in the sorbent combination. However, the matrix effects do reflect the added eluate clean up provided by the OSTRO® sorbent.

TABLE 18

Summary of recoveries, standard deviations and matrix effects on the three different sorbent combinations in 96-well µElution plates

| Plate n = 4 | | AZT | Prop | 7HC | Phen | Protr | Ami | Beta Meth | Alpraz | Naprox |
|---|---|---|---|---|---|---|---|---|---|---|
| | Sorbent % Recovery | | | | | | | | | |
| A | 3 mg Mixed HLB/OSTRO® | 50 | 90 | 92 | 95 | 93 | 92 | 89 | 74 | 92 |
| B | 1 mg HLB on top/2 mg OSTRO® on bottom | 44 | 90 | 90 | 94 | 92 | 91 | 90 | 73 | 93 |
| C | 2 mg OSTRO® on top/1 mg HLB on bottom | 48 | 91 | 93 | 97 | 94 | 95 | 92 | 77 | 92 |
| | Standard Deviation | | | | | | | | | |
| A | 3 mg Mixed HLB/OSTRO® | 2 | 2 | 4 | 2 | 2 | 2 | 2 | 1 | 2 |
| B | 1 mg HLB on top/2 mg OSTRO® on bottom | 3 | 5 | 5 | 5 | 3 | 4 | 4 | 3 | 6 |
| C | 2 mg OSTRO® on top/1 mg HLB on bottom | 5 | 6 | 7 | 5 | 6 | 5 | 6 | 8 | 7 |
| | Matrix Effects | | | | | | | | | |
| A | 3 mg Mixed HLB/OSTRO® | 0.3 | 3.8 | 5.9 | 1.6 | 1.7 | 1.9 | 9.0 | 1.5 | −5.5 |
| B | 1 mg HLB on top/2 mg OSTRO® on bottom | 2.5 | 4.6 | 5.7 | 1.9 | 3.1 | 1.3 | 10 | 1.2 | −5.5 |
| C | 2 mg OSTRO® on top/1 mg HLB on bottom | 8.1 | 10 | 12 | 7.2 | 8.3 | 7.4 | 16 | 5.8 | 1.1 |

Example 12

Other Sorbent Combinations

The popularity of OASIS® HLB has spurred the development of similar products that have worked around it patent. The OSTRO® sorbent as well has been imitated in the market place. The most similar products to OASIS® HLB and OSTRO®, on the market today, are the Strata X polymeric hydrophobic sorbent and Phree, respectively. Both of these imitations (used here to describe a product introduced after the original products) are sold by Phenomenex. Strata X was already mentioned in an earlier EXAMPLE. The description provided by Phenomenex of Phree is "Phree Phospholipid Removal Solutions offer a fast effective way to remove proteins AND phospholipids from plasma samples without negatively affecting the recovery of your target analytes." To see if our inventive sorbent combination is unique to OASIS® HLB and OSTRO®, a similar combination was prepared using the Strata X and Phree sorbents in the same 1:2 weight ratios used for OASIS® HLB and OSTRO®.

Procedure

The µElution plate was used as the device for these experiments. Plates were prepared using 2 mg of OASIS® HLB, 2 mg of Strata X, mixture of Strata X and Phree in a weight ratio of 1:2. The sources of the Phenomenex sorbents were commercially available products.

The plates were tested by loading 500 µL of 1:1 diluted plasma: 4% H3PO4 in water, washing with 500 µL of 5% methanol in water and then eluting with 2×50 µL of 90/10 acetonitrile/methanol (v/v) solution. The eluates were analyzed using the methods included in the experimental section except where otherwise indicated.

Results

The Table below shows a summary for the summed phospholipids for plates A, B, and C. The summed values for the phospholipids are the summed signal area for the following MRM phospholipid transitions: 496.4→184.3, 520.4→184.3, 522.4→184.3, 524.4→184.3, 704.4→184.3, 758.4→184.3 and 806.4→184.3. As can be seen in the table below, the single sorbents show about 15-20× higher summed PL than the mixed sorbent plate containing STRATA X and Phree.

TABLE 18

Summary of the summed signal areas for the phospholipids for the four different sorbents in 96-well µElution plates

| Sorbents (n = 8 replicates) | Summed PL | Single Sorbent/mix |
|---|---|---|
| 2 mg HLB | 213,947,898 | 20x higher than the mix |
| 2 mg Strata X | 164,053,366 | 16x higher than the mix |
| 1 mg Strata X/2 mg Phree Mixture | 9,993,682 | reference |

The table below shows a comparison of the recoveries and standard deviations for the same plates. The best recoveries were obtained for HLB in this experiment. This example highlights the issue that not all lots of rat plasma (or human plasma) are the same and may produce differences in recovery as well for PL, which appears higher than usual for all the different sorbents. The recoveries for the mixed sorbent plate are similar to those for its single sorbent plate, except for the recovery of AZT, which is lower.

TABLE 19

Summary of recoveries and standard deviations for the three different sorbents in 96-well µElution plates.

|  | AZT | Prop | 7HC | Phen | Protr | Ami | BetaMeth | Alpraz | Naprox |
|---|---|---|---|---|---|---|---|---|---|
| % Recovery Sorbent |  |  |  |  |  |  |  |  |  |
| 2 mg HLB | 93 | 106 | 95 | 99 | 98 | 107 | 105 | 85 | 93 |
| 2 mg Strata X | 55 | 105 | 101 | 99 | 95 | 103 | 91 | 76 | 91 |
| 1 mg Strata X 2 mg Phree Mix | 33 | 98 | 88 | 95 | 94 | 106 | 96 | 71 | 95 |
| STD |  |  |  |  |  |  |  |  |  |
| 2 mg HLB | 2 | 4 | 3 | 4 | 3 | 3 | 4 | 3 | 3 |
| 2 mg Strata X | 2 | 4 | 3 | 3 | 3 | 3 | 3 | 4 | 2 |
| 1 mg Strata X 2 mg Phree Mix | 1 | 4 | 4 | 4 | 5 | 4 | 4 | 3 | 5 |

Example 13

Flowrate Improvements

Chromatographic sorbents, in particular Reverse Phase (RP) sorbents, are often used for solid-phase extraction (SPE). Reverse phase sorbents are generally either polymer based, such as OASIS® HLB, or are made by bonding silica particles with a hydrophobic ligand (such as OSTRO®). RP particles may vary considerably in their degree of hydrophobicity, ranging from relatively hydrophilic to the hydrophilic/lipophilic balanced sorbent such as OASIS® HLB, to the hydrophobic (OSTRO®). Waters manufactures a number of other sorbents covering a broad range of hydrophobicity.

Those experienced in managing liquid flow rates through SPE devices have observed that a certain percentage of their aqueous samples or subsequent aqueous solutions can be more difficult than others to pass through the device. The mechanism causing this flow variability is not fully understood, but lies in an unfavorable interaction between the device, sorbent, and sample/solutions, particularly at low vacuum/pressure settings. The problem is most pronounced when multiple highly aqueous samples/solutions are passed through reverse phase type devices whether these devices contain purely hydrophobic or water wettable hydrophilic/lipophilic balanced type particles. This unpredictable flow characteristic usually requires some user intervention of various forms, to force the fluid to pass, and avoid loss of the sample. These activities add cost, time and complexity. Therefore, any improvement which leads to faster and more repeatable flow properties will result in an improved device.

Because analysts are frequently working with biological samples—prone to containing endogenous particulates of various forms—this lack of predictable flow was blamed on the sample. Although endogenous particulates do not help the flow rate performance of SPE devices, the analyst's experience has been reproduced by sequentially flowing two separate aliquots of filtered pure Milli-Q water through an unused device using a vacuum setting of 6" Hg. The problem solved by this invention is that although the first aqueous solution/sample through the device may flow well, problems are encountered in maintaining a similar flow rate for subsequent aqueous solutions whether they are a sample or pure water.

Chromatographic sorbents, in particular Reverse Phase (RP) sorbents, are often used for SPE. Reverse phase sorbents are generally either polymer based, such as OASIS® HLB (HLB), or are made by bonding silica particles with a hydrophobic ligand (such as OSTRO®). RP particles may vary considerably in their degree of hydrophobicity, ranging from relatively hydrophilic, (OASIS® HLB), to the hydrophobic (OSTRO®). Waters manufactures a number of other sorbents covering a range of hydrophobicity.

An aspect of this invention uses a mixture of sorbent-types, in a packed bed device where one of the sorbent-types is substantially more hydrophilic (OASIS® HLB) and the other substantially more hydrophobic (OSTRO®). It has been found that by mixing the two powders together in a chromatographic device such as an SPE device, that the flow properties are enhanced when compared to the flow properties using either sorbent alone, or when compared to a device where the two sorbents have been layered separately in the same device. This improvement results in a more permeable bed structure, which flows faster and more consistently and also minimizes unwanted flow blockages when low vacuum/pressure driving forces are used.

The flow rates of water or aqueous samples through the inventive mixed sorbent type beds are substantially faster than those through the same amounts of a mixture of the same particle size combinations of the HLB sorbents. Below is a table for the flow rates for water obtained on 30 mg packed bed devices after conditioning with water to displace the air in the bed. Various weight combinations of different particle sizes of OASIS® HLB were investigated and compared to those for the combination of OASIS® HLB 30 µm and 20 µm OSTRO®.

Procedure 1 cc devices were prepared using the same bottom frit and top frit used in all other 1 cc devices of the invention. The filling process involves inserting the bottom frit into a 1 cc cartridge, adding 30 mgs of the various combined sorbent, and then stacking the device with the top frit which acts to confine the combined sorbents in a packed bed having an external porosity of about 0.4. This porosity is defined as the fluid volume in a fluid filled bed excluding the particle skeletal structure volume and its pore volume to the volume that the entire bed occupies. Sufficient quantities of the bulk sorbent combinations to make 4, 1 cc packed bed devices for each of the mass ratios tested. For example the bulk combination for the 4 1 cc devices containing 10 mg HLB 30 µm: 20 mg HLB 60 µm each was prepared by weighing on an analytical balance 100 mg of HLB 30 µm and adding 200 mg of HLB 60 µm. The powder was well mixed and the excess mixture allowed 4 1 cc devices to be prepared.

Each 1 cc contains a total of 30 mg of combined sorbents of various ratios. Each device was tested one at a time on a standard 20-position vacuum manifold. The vacuum was monitored using a calibrated vacuum gauge. The vacuum in the manifold was adjusted to 6" Hg. 1 mL of Milli-Q water was added to condition each device and displace the air. A second aliquot of water was added to each device and the time it took to flow the 1 mL of water under 6" Hg was monitored and recorded by a calibrated stop watch. The time was converted to a flow rate using the formula: 1 mL/record time in minutes.

Results

Listed in the table below are the water flow rates for the various sorbent combinations. The first flow rate entry in the table is that for 100% of the other sorbent used in the combination. The last flow rate entry in the table is for 100% HLB 30 µm. As shown in the table all of the three flow rates for the 100% HLB 30 µm are reasonably close. When the time to empty a device exceeded 10 or 20 min the flow was entered as a less than value. For the combination of 30 and 60 µm HLB, the flow rates on the devices become lower than those obtained on the 30 µm HLB and 20 µm OSTRO® sorbents once the amount of 30 µm HLB exceeded 5 mg.

Essentially the same particle size combinations to those used in the 30 µm HLB: 20 µm OSTRO® devices were prepared from 30 and 20 µm HLB. These HLB: HLB devices gave extremely low flow rates at all combinations. Once the amount of 30 µm HLB in 20 µm OSTRO® was or exceeded 5 mg the flow rates through the devices were dramatically increased until the bed was composed of only 30 µm HLB. In fact the combination of the hydrophilic/lipophilic 30 µm HLB and the hydrophobic 20 µm OSTRO® flowed faster than the combination of 30 and 60 µm HLB in a similar weight ratio range.

TABLE 20

Water flow rates for various sorbent combinations compared to the inventive devices

| Wt:Wt Sorbent Mixtures HLB 30 µm:Other | Other Sorbents | | |
|---|---|---|---|
| | OSTRO® 20 µm | HLB 20 µm | HLB 60 µm |
| | Vacuum Setting | | |
| | 6" Hg | 6" Hg | 6" Hg |
| | Average Flow Rates, n = 4 (mL/min) | | |
| 30 mg Other Sorbent | <0.05 | <0.1 | 4.63 |
| 1 mg:29 mg | 0.17 | <0.10 | 3.15 |
| 5 mg:25 mg | 2.14 | <0.10 | 3.37 |
| 10 mg:20 mg | 2.69 | <0.10 | 2.12 |
| 15 mg:15 mg | 2.38 | <0.10 | 1.79 |
| 20 mg:10 mg | 2.36 | 0.13 | 0.88 |
| 25 mg:5 mg | 1.73 | 0.31 | 0.49 |
| 30 mg HLB 30 µm | 0.25 | 0.48 | 0.36 |
| n = 4 | Flow Rate STD | | |
| 30 mg Other Sorbent | — | — | 1.82 |
| 1 mg:29 mg | 0.03 | — | 0.82 |
| 5 mg:25 mg | 0.25 | — | 0.16 |
| 10 mg:20 mg | 0.27 | — | 0.77 |
| 15 mg:15 mg | 0.29 | — | 0.70 |
| 20 mg:10 mg | 0.47 | 0.02 | 0.30 |
| 25 mg:5 mg | 0.19 | 0.52 | 0.24 |
| 30 mg HLB 30 µm | 1.14 | 0.01 | 0.77 |

The results in the table above are completely unexpected based on the average particle size in the combined sorbents. A well known and understood relationship between particle size and the expected back pressure of a packed bed device or LC column is expressed theoretically in the Kozeny-Carmen equation.

Based on the Kozeny-Carmen equation (1) flow rate through a packed bed is proportion to the particle diameter squared for a given delta pressure ($\Delta P$) which in this case is a vacuum of 6" Hg. In the experimental data shown above the radius (r) of the device, the length (L) of the bed, the viscosity ($\eta$) of the solution (water), and the external porosity ($\epsilon_e$) of the packed particle bed remain essentially constant.

$$F = d_p^2 \frac{\varepsilon_e^3}{(1-\varepsilon_e)^2} \frac{\Delta P}{180\eta} \frac{r^2 \pi}{L} \quad (1)$$

Example 14

Layered Versus Combined Sorbent Packed Bed Backpressures

This invention not only makes state of the art SPE devices containing ~30 µm particles perform more robustly at vacuum settings typically used (5.5-6.5" Hg) but would also allow the use of smaller particle sizes that may be more compatible with micro-sampling (<10 µL) devices gaining in popularity today. It can be anticipated that smaller SPE particles would enable smaller elution volumes that would prevent excessive dilution of very low volume samples (<10 µL).

Using 1 cc 30 mg packed bed devices, water flow rates were measured as described in Example 13. In this example every device contained 20 mg of OSTRO® and 10 mg of HLB. However, in this case the flow rates through the devices in which the sorbents are layered with the OSTRO® on the bottom and the HLB on the top were compared to those in which the sorbents were combined.

Listed in the table below are the water flow rates obtained in the same manner as above but at various vacuum settings. The flow rates of water through the inventive mixed sorbent type beds are substantially faster than those through the same amounts and types of sorbent in the device but just layered. As can be seen in the table below at 5" Hg vacuum, no flow is obtained on the layered bed devices while >1 mL/min is achieved for the same delta pressure across the mixed sorbent bed. The sorbents in the layered and mixed sorbent devices are the same two sorbents and each device contains the same weight of each.

At higher delta pressures, flow is obtained on both layered and mixed bed devices. However, substantially (over 2×) faster flow rates are achieved for the mixed sorbent bed devices indicating higher permeability.

TABLE 21

Water flow rate comparison between layer and mixed sorbent beds in 1 cc

| n = 5 | Water Flow Rates (mL/min) | |
| --- | --- | --- |
| Vacuum | Layered | Mixed |
| 5" Hg | <0.06 | 1.2 |
| 8" Hg | 0.6 | 2.7 |
| 10" Hg | 1.5 | 3.5 |
| | Standard Deviation | |
| 5" Hg | — | 0.2 |
| 8" Hg | 0.03 | 0.4 |
| 10" Hg | 0.2 | 0.7 |

Example 15

Investigation of External Porosity of the Mixed Sorbent Beds

There are many ways to define the tendency of a solid to interact favorably with water. If a solid surface is perfectly flat and free of contamination, and a contact angle between a drop of water on the surface is less than 90° that surface is considered hydrophilic. If the contact angle is greater than 90° the surface is considered hydrophobic. Unfortunately, the measurement of contact angles between porous particles and water are not that straightforward. Contact angle is increased by the roughness/irregularity of a hydrophobic surface and/or the presence of trapped air in the surface imperfections. In addition to providing insight into wettability, contact angles are also used to understand adhesive forces and solid surface free energy.

The physics or phenomenon behind the flow rate improvement in the mixed sorbent beds of this invention is not entirely known at this time. One factor is the higher porosity of the mixed sorbent type beds. For this experiment, both of the sorbents were selected to be 20 μm to rule out the possibility that the difference in the particle sizes (30 μm HLB and 20 μm OSTRO®) contributed to the observed lower backpressure for the devices. The increase in bed porosity is shown to be unrelated to mixing different particle sizes.

The bed heights of the mixed sorbent type devices were measured and reported in the table below. Based on the height of 30 mg of 20 μm HLB and 30 mg of 20 μm OSTRO®, the bed heights of layered devices were calculated using a device diameter of 0.221". Using the volume of a cylinder ($\pi r^2 L$), the volume of layered vs. mixed bed devices were calculated. Single sorbent devices, assembled as described, typically have an external porosity (spaces between particles where flow occurs) of 0.40 and this was assumed for the single sorbent HLB and OSTRO® devices.

The calculated and measured data are shown in the table below. Based on our calculations, the external porosity of the mixed sorbent type beds increased to 0.47. This experiment was performed using particles of similar size (20 μm) to avoid any influence of combining particles of multiple sizes. The data shows that the increased flow rates were obtained for the higher porosity mixed sorbent type beds. Reasonable water flow rates (<0.1 mL/min) were not achieved for the single sorbent devices at 6" Hg vacuum.

TABLE 22

Mixed sorbent type bed heights, volumes, external porosities and water flow rates (mL/min) at 6" Hg.

| 20 μm | | Bed Height in inches | | Total Bed Volume (cc) | | Mixed Sorbent Devices | |
| --- | --- | --- | --- | --- | --- | --- | --- |
| HLB mg | OSTRO® mg | Mixed Measured | Layered Calculated* | Mixed measured | Layered calculated* | External Porosity | Flow Rate at 6" Hg |
| 0 | 30 | 0.091 | 0.091 | 0.057 | 0.057 | 0.40 | <0.10 |
| 1 | 29 | 0.106 | 0.093 | 0.067 | 0.058 | 0.47 | 0.30 |
| 5 | 25 | 0.113 | 0.101 | 0.071 | 0.063 | 0.46 | 1.57 |
| 10 | 20 | 0.125 | 0.111 | 0.079 | 0.070 | 0.47 | 2.23 |
| 15 | 15 | 0.131 | 0.121 | 0.082 | 0.076 | 0.45 | 1.58 |
| 20 | 10 | 0.134 | 0.131 | 0.084 | 0.082 | 0.41 | 0.60 |
| 25 | 5 | 0.140 | 0.141 | 0.088 | 0.089 | 0.40 | 0.49 |
| 30 | 0 | 0.151 | 0.151 | 0.095 | 0.095 | 0.40 | <0.10 |

*Based on the assumption that 30 mg of OASIS® HLB or OSTRO® packed into 1 cc cartridges at a bed height of 0.151" or 0.091", respectively, have bed external porosities of 0.40.

Example 16

Invention Compared to State-of-the-Art Polymeric Sorbents

Four state-of-the-art commercially available 10 mg 96-well plates were purchased for this comparison. Information on all has been given in previous examples except for the 10 mg EVOLTE® ABN 96-well plate (PN 600-0010-RP) from Biotage. Biotage describes the sorbent as an "Advanced Polymeric SPE for Acidic, Basic and Neutral Analytes." Biotage claims that their sorbent was "developed specifically for analyte quantification by LC-MS/MS, EVOLUTE products provide a highly effective solution to the problems of ion suppression and matrix effects."

In this example 10 mg plates are used to prepare whole blood samples for the LC-MS/MS analysis of synthetic cannabinoids. The same volumes were used in the 10 mg plates as were used in the 30 mg plate in example 8. The importance of providing a device that substantially reduces phospholipids becomes apparent in this application.

Procedure

Samples were prepared using the same protocol described in EXAMPLE 8 except that the commercially available plates other than the OASIS® HLB plate were conditioned with methanol and equilibrated with water prior to loading the PPT and diluted samples. MS/MS transitions, MS conditions and LC conditions were given in EXAMPLE 8 and followed for the acquisition of this data as well.

Results

As shown in the table below the best average % recovery (% REC) was obtained in the plate containing the inventive sorbent mixture (about 1:2 by weight). The OASIS® HLB plate came in next with 93% recovery. Retention for the most polar cannabinoid (AM2233) was problematic for the Strata X and Plexa plates.

TABLE 23

Recoveries for synthetic cannabinoids

| Synthetic Cannabinoids | Evolute ABN 5 steps % REC | Strata X RP 5 steps % REC | Bond Elut Plexa RP 5 steps % REC | OASIS® HLB 3 steps % REC | Invention 3 steps % REC |
|---|---|---|---|---|---|
| AM2233 | 71 | 59 | 46 | 89 | 71 |
| RCS4, M10 | 91 | 83 | 55 | 98 | 92 |
| RCS 4, M11 | 95 | 85 | 63 | 99 | 98 |
| AM 1248 | 80 | 71 | 63 | 93 | 99 |
| JWH-073, 4-COOH | 88 | 78 | 70 | 89 | 91 |
| JWH-073, 4-OH | 96 | 93 | 83 | 99 | 100 |
| JWH-018, 5COOH | 85 | 78 | 73 | 92 | 92 |
| JWH-073, 3-OH | 94 | 91 | 82 | 99 | 101 |

TABLE 23-continued

Recoveries for synthetic cannabinoids

| Synthetic Cannabinoids | Evolute ABN 5 steps % REC | Strata X RP 5 steps % REC | Bond Elut Plexa RP 5 steps % REC | OASIS® HLB 3 steps % REC | Invention 3 steps % REC |
|---|---|---|---|---|---|
| JWH-018, 5-OH | 96 | 90 | 83 | 102 | 97 |
| JWH-018, 4-OH MET | 97 | 92 | 84 | 101 | 100 |
| JWH-015 | 88 | 80 | 81 | 94 | 100 |
| RCS-4 | 91 | 85 | 84 | 98 | 100 |
| JWH-022 | 87 | 79 | 78 | 95 | 103 |
| JWH-073 | 87 | 79 | 80 | 98 | 101 |
| XLR-11 | 94 | 86 | 81 | 101 | 102 |
| JWH-203 | 60 | 93 | 72 | 116 | 100 |
| JWH 018 | 86 | 75 | 74 | 90 | 103 |
| RSC-8 | 76 | 75 | 76 | 84 | 106 |
| UR-144 | 79 | 78 | 78 | 86 | 105 |
| JWH-210 | 74 | 67 | 67 | 76 | 112 |
| AB-001 | 72 | 70 | 65 | 69 | 110 |
| AKB-48 | 72 | 71 | 71 | 70 | 111 |
| AVG | 85 | 80 | 73 | 93 | 100 |

The standard deviations (STD) for the recoveries are listed in the table below. Unexpectedly high STDs were obtained for cannabinoid JWH-203 for all of the plates except that of the invention. A careful review of the data showed that a complete co-elution of this cannabinoid occurs with one of the common PL.

TABLE 24

Standard deviations for synthetic cannabinoids

| 10 mg Plates Protocol steps Synthetic Cannabinoids | Evolute ABN 5 steps STD | Strata X RP 5 steps STD | Bond Elut Plexa RP 5 steps STD | OASIS® HLB 3 steps STD | OASIS PRiME® HLB 3 steps STD |
|---|---|---|---|---|---|
| AM2233 | 10 | 2 | 9 | 4 | 5 |
| RCS4, M10 | 5 | 3 | 8 | 5 | 6 |
| RCS 4, M11 | 1 | 4 | 6 | 4 | 5 |
| AM 1248 | 1 | 7 | 8 | 6 | 7 |
| JWH-073, 4-COOH | 1 | 4 | 5 | 5 | 6 |
| JWH-073, 4-OH | 2 | 3 | 4 | 4 | 4 |
| JWH-018, 5COOH | 2 | 6 | 8 | 3 | 6 |
| JWH-073, 3-OH | 2 | 2 | 3 | 3 | 4 |
| JWH-018, 5-OH | 2 | 5 | 3 | 3 | 3 |
| JWH-018, 4-OH MET | 3 | 2 | 6 | 3 | 4 |
| JWH-015 | 5 | 14 | 3 | 5 | 3 |
| RCS-4 | 5 | 12 | 4 | 3 | 3 |
| JWH-022 | 5 | 15 | 4 | 5 | 4 |
| JWH-073 | 5 | 14 | 4 | 4 | 4 |
| XLR-11 | 6 | 12 | 3 | 5 | 4 |
| JWH-203 | 14 | 22 | 15 | 12 | 3 |
| JWH 018 | 7 | 15 | 9 | 7 | 3 |
| RSC-8 | 13 | 14 | 18 | 7 | 3 |
| UR-144 | 8 | 16 | 13 | 6 | 3 |
| JWH-210 | 16 | 23 | 30 | 9 | 3 |

TABLE 24-continued

Standard deviations for synthetic cannabinoids

| 10 mg Plates<br>Protocol steps<br>Synthetic Cannabinoids | Evolute<br>ABN<br>5 steps<br>STD | Strata X<br>RP<br>5 steps<br>STD | Bond Elut Plexa<br>RP<br>5 steps<br>STD | OASIS ® HLB<br>3 steps<br>STD | OASIS PRiME ®<br>HLB<br>3 steps<br>STD |
|---|---|---|---|---|---|
| AB-001 | 17 | 27 | 39 | 7 | 3 |
| AKB-48 | 17 | 26 | 41 | 12 | 4 |
| AVG | 7 | 11 | 11 | 6 | 4 |

Matrix effects for JWH-203 and summed phospholipids were calculated and quantified, respectively. These data are included in the table below along with the % recoveries for JWH-203. Keep in mind that the same sample was loaded on all devices. The expected result is 100% and the deviation from this appears t be related to the phospholipids in the sample that do not have a means to eliminate them from the final analyte extract as this invention does.

TABLE 25

Summary of data for on JWH-203.

| JWH-203 | Invention | Plexa | Strata x | EVO ABN | HLB |
|---|---|---|---|---|---|
| Recovery | 99.5 | 60.0 | 92.9 | 72.3 | 115.8 |
| Matrix Effect | −11 | −83 | −88 | −79 | −94 |
| Phospholipids | 32,888 | 4,414,791 | 5,178,748 | 3,978,908 | 7,408,482 |

The entire contents of all patents, published patent applications and other references cited herein are hereby expressly incorporated herein in their entireties by reference.

Those skilled in the art will recognize, or be able to ascertain using no more than routine experimentation, numerous equivalents to the specific procedures described herein. Such equivalents are considered to be within the scope of this invention and are covered by the following claims.

We claim:

1. A separation device comprising two or more sorbents that comprise (a) a polymeric sorbent that contains at least one hydrophobic component and at least one hydrophilic component, which is water wettable and (b) an additional sorbent that has a specific affinity to phospholipids, which is a silica-based sorbent containing modified or unmodified $C_5$ to $C_{30}$ alkyl components.

2. The separation device of claim 1, wherein the separation device is a solid-phase extraction device that comprises an inlet, an outlet, the two or more sorbents, and a housing that is configured to contain the two or more sorbents.

3. The separation device of claim 1, wherein at least one of the sorbents has retention for analytes having a log P of 0.05 or greater in aqueous solutions.

4. The separation device of claim 3, wherein the remainder of the sorbents, in total, have a specific affinity for phospholipid matrix interferences in greater than 40% organic solvent solutions.

5. The separation device of claim 1, wherein the sorbents are layered.

6. The separation device of claim 5, wherein a top layer of the layered sorbents is water-wettable.

7. The separation device of claim 6, wherein the top layer is the polymeric sorbent that contains at least one hydrophobic component and at least one hydrophilic component.

8. The separation device of claim 1, wherein the sorbents are mixed in a single layer.

9. The separation device of claim 8, wherein the single layer is water-wettable.

10. The separation device of claim 8, wherein the polymeric sorbent that contains at least one hydrophobic component and at least one hydrophilic component and the additional sorbent having a specific affinity to phospholipid are mixed at a weight ratio of about 1:2.

11. The separation device of claim 1, wherein the polymeric sorbent that contains at least one hydrophobic component and at least one hydrophilic component is a reversed-phase sorbent.

12. The separation device of claim 1, wherein the additional sorbent that has a specific affinity to phospholipids is a silica-based sorbent containing a modified or unmodified octadecyl ($C_{18}$) component.

13. The separation device of claim 1, wherein the separation device is a chromatographic column, which comprises an inlet, an outlet, the two or more sorbents and a housing that is configured to contain the two or more sorbents.

* * * * *